(12) United States Patent
Hosmer et al.

(10) Patent No.: US 11,174,092 B2
(45) Date of Patent: Nov. 16, 2021

(54) RECYCLABLE AEROSOL DISPENSERS

(71) Applicant: The Procter & Gamble Company, Cincinnati, OH (US)

(72) Inventors: Jennifer Elizabeth Hosmer, Fairfield, OH (US); Robert Earl Magness, Lebanon, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/096,984

(22) Filed: Nov. 13, 2020

(65) Prior Publication Data
US 2021/0155398 A1 May 27, 2021

Related U.S. Application Data

(60) Provisional application No. 62/940,007, filed on Nov. 25, 2019.

(51) Int. Cl.
*B65D 83/38* (2006.01)
*B65D 83/48* (2006.01)
*B65D 83/62* (2006.01)

(52) U.S. Cl.
CPC .............. *B65D 83/38* (2013.01); *B65D 83/48* (2013.01); *B65D 83/62* (2013.01)

(58) Field of Classification Search
CPC ......... B65D 83/38; B65D 83/48; B65D 83/62
See application file for complete search history.

(56) References Cited

U.S. PATENT DOCUMENTS

| | | | | |
|---|---|---|---|---|
| 2,831,618 A | * | 4/1958 | Soffer | B65D 83/14 222/402.22 |
| 2,994,461 A | * | 8/1961 | Daniel | B65D 83/46 222/153.11 |
| 8,439,223 B2 | | 5/2013 | Smith et al. | |
| 8,865,824 B2 | | 10/2014 | Bunnelle | |
| 9,187,679 B2 | | 11/2015 | Bunnelle | |
| 9,296,550 B2 | | 3/2016 | Smith | |
| 9,670,388 B2 | | 6/2017 | Bunnelle | |
| 9,758,295 B2 | * | 9/2017 | Smith | B65D 83/48 |

(Continued)

FOREIGN PATENT DOCUMENTS

| | | |
|---|---|---|
| EP | 0721376 A1 | 7/1996 |
| EP | 3403948 A1 | 11/2018 |

OTHER PUBLICATIONS

All Office Actions, U.S. Appl. No. 17/096,986.
(Continued)

*Primary Examiner* — Paul R Durand
*Assistant Examiner* — Randall A Gruby
(74) *Attorney, Agent, or Firm* — Sarah M DeCristofaro; S. Robert Chuey

(57) ABSTRACT

A polymeric aerosol dispenser that is recyclable. The recyclable polymeric aerosol dispenser including all polymeric components. These components being selectively either fixedly joined or separably joined based on the material composition of the component. Further, components may be selected for their density and, thus, their ability to float or sink during the recycling process. The recyclable polymeric aerosol dispenser is designed to minimize its impact on the PET recycling stream and to align with industry recyclability guidelines.

26 Claims, 11 Drawing Sheets

(56) References Cited

U.S. PATENT DOCUMENTS

| | | |
|---|---|---|
| 9,919,862 B2 | 3/2018 | Smith |
| 9,994,742 B2 | 6/2018 | Bunnelle |
| 10,081,483 B2 | 9/2018 | Smith |
| 10,308,843 B2 | 6/2019 | Bunnelle |
| 10,538,351 B2* | 1/2020 | Smith .................. B65B 61/186 |
| 10,569,952 B2 | 2/2020 | Smith |
| 10,676,272 B2 | 6/2020 | Smith |
| 11,014,699 B2* | 5/2021 | Smith ................. B29C 65/0672 |
| 2005/0242101 A1 | 11/2005 | Skalitzky |
| 2015/0375922 A1 | 12/2015 | Smith et al. |
| 2016/0377231 A1* | 12/2016 | Smith ....................... F16K 1/30 251/325 |
| 2017/0341849 A1 | 11/2017 | Wolak et al. |
| 2018/0044097 A1 | 2/2018 | Zeik |
| 2018/0334313 A1* | 11/2018 | Smith ................... B65D 83/48 |
| 2019/0077582 A1* | 3/2019 | Franckhauser ........ B65D 83/44 |
| 2019/0077583 A1* | 3/2019 | Weaver .................. B29B 11/14 |
| 2019/0077584 A1* | 3/2019 | Magness ................ B65D 83/44 |
| 2019/0135530 A1* | 5/2019 | Franckhauser ........ B65D 83/44 |
| 2019/0315559 A1* | 10/2019 | Magness ................ B65D 83/38 |
| 2020/0108957 A1* | 4/2020 | Smith .................. B65B 61/186 |
| 2020/0188945 A1* | 6/2020 | Butler .................... B65D 53/02 |
| 2021/0024280 A1* | 1/2021 | Cassoni ................ B65D 83/48 |
| 2021/0025501 A1* | 1/2021 | Dalton .................... F16K 41/02 |
| 2021/0025503 A1* | 1/2021 | Dalton .................... F16K 1/303 |
| 2021/0025518 A1* | 1/2021 | Dalton ................... B65D 83/32 |
| 2021/0155399 A1* | 5/2021 | Hosmer ................. B65D 83/62 |

OTHER PUBLICATIONS

"Aerosol Dispensing Package with Flexible Sprial-Wound Supply Tube" Research Disclosure, Kenneth Masonpublications 9 Hampshire UK 9 GB,No. 369 9, Jan. 1, 1995 (Jan. 1, 1995), 3 pages. XP000494425, ISSN: 0374-4353P.

Apr: "Critical Guidance Protocol for Clear PET Articles with Labels and Closures" Retrieved from the Internet:URL: <https://plasticsrecycling.org/images/Design-Guidance-Tests/APR-PET-CG-02-critical-guidance.pdf>Feb. 12, 2021, pp. 1-8.

Baur Erwin: 11 Saechtling KunststoffTaschenbuch 11In: 11 Saechtling Kunststoff Taschenbuch. IIDec. 31, 2007 (Dec. 31, 2007), Carl Hasne' Rverlag., M?nchen, DE, XP055775700,ISBN: 978-3-446-40352-9pages 618-618,p. 618, table 6.59, line 11 SBS 11.

International Search Report and Written Opinion; Application Ser. No. PCT/US2020/070781; dated Feb. 16, 2021, 13 pages.

U.S. Appl. No. 17/096,986, filed Nov. 13, 2020, Jennifer Elizabeth Hosmer et al.

* cited by examiner

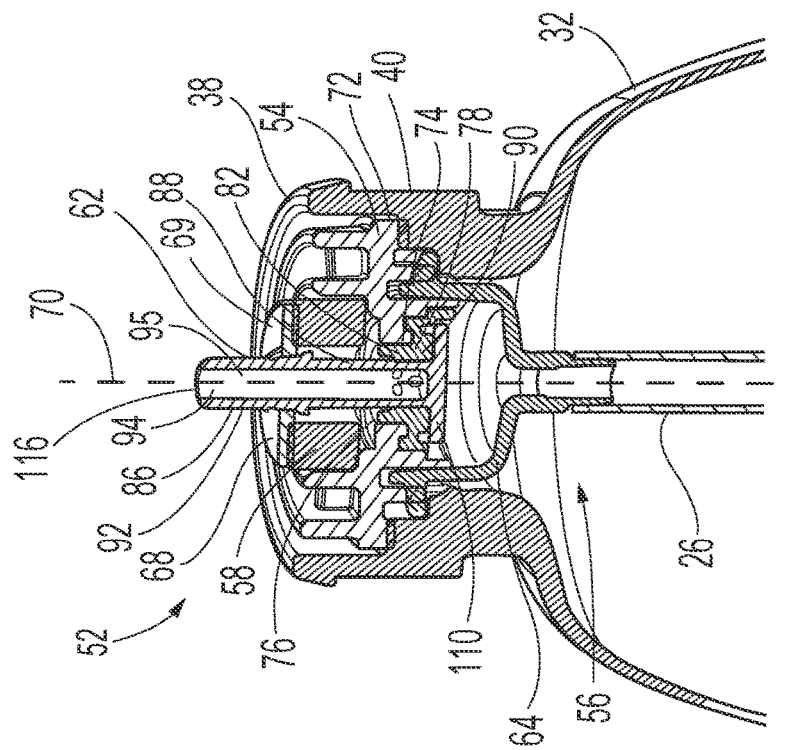
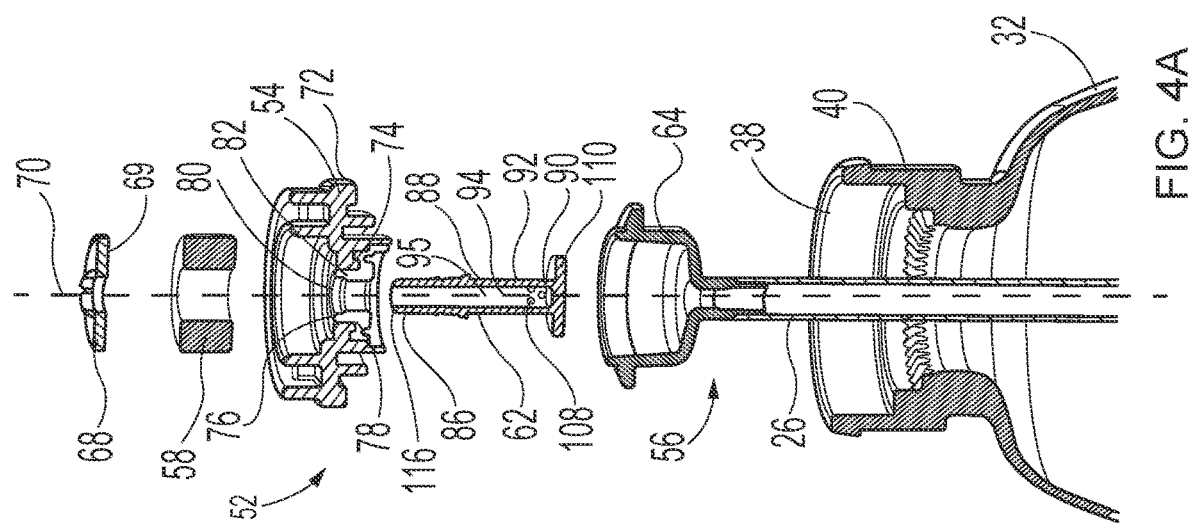

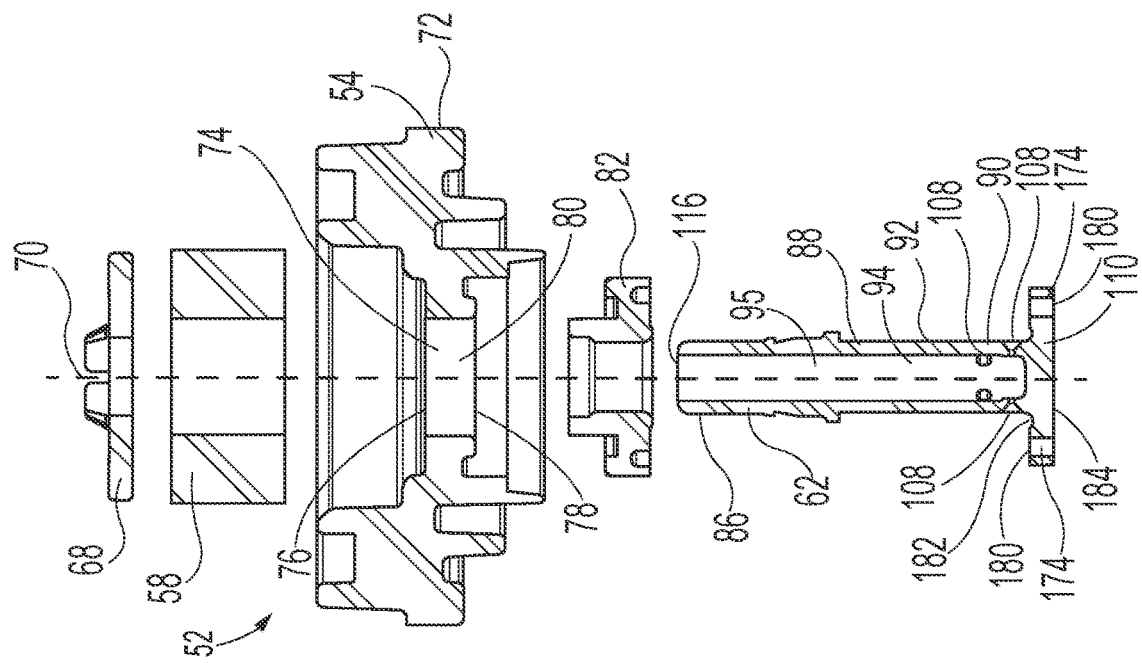
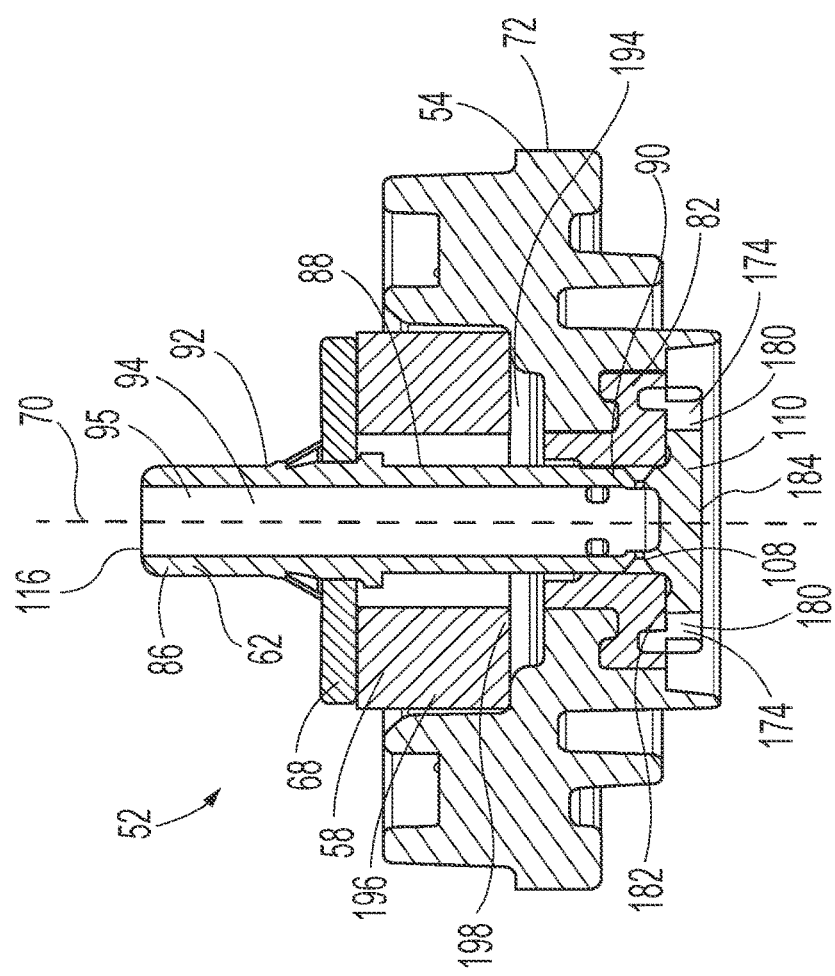

RECYCLABLE AEROSOL DISPENSERS

FIELD

The present disclosure is directed to a recyclable aerosol dispensers, and, in particular, to a polymeric, recyclable aerosol dispenser.

BACKGROUND

Pressurized dispensing systems, such as systems used to dispense aerosol products, have conventionally included metallic (e.g., steel or aluminum) containers for containing the product under pressure before it is dispensed from the system. Examples of products that are dispensed with such systems include air fresheners, fabric fresheners, insect repellants, paints, body sprays, hair sprays, shoe or footwear spray products, whipped cream, and processed cheese. Recently, there has been increased interest in using polymeric containers as an alternative to metallic containers in pressurized dispensing systems because polymeric containers have several potential advantages. For example, polymeric container may be easier and cheaper to manufacture than metallic containers, and polymeric containers may be made in a wider variety of shapes than metallic containers. Additionally, metal containers may be undesirable due to relatively higher cost and being relatively less sustainable.

Aerosol dispensers typically include: a container which acts as a pressure vessel for propellant and product contained therein; a valve assembly connected to the container to selectively dispense product and/or propellant from the container; a product delivery device that interfaces with the product and/or propellant and passes the product and/or propellant to the valve assembly during dispensing; and an actuator that provides the interface between the end-user and the valve assembly that allows the product and/or propellant to be dispensed easily and appropriately by the end-user/consumer.

The containers are typically, but not necessarily, cylindrical. The container may include a closed end bottom for resting on horizontal surfaces such as shelves, countertops, tables etc. The bottom of the container may comprise a re-entrant portion or base cup. The sidewalls define the shape of the container and extend upwardly from the bottom to an opening at a top of the container. The opening at the top of the container defines a neck. A valve assembly may be joined to the neck of the container.

Typically, a valve assembly 8 may be joined to a container to allow for selective dispensing of a product. With reference to FIG. 1, the valve assembly 8 may include a metal valve cup 10 inserted at least partially into the neck of the container. The valve cup 10 is crimped against a crimp ring of a container to seal the container and prevent the escape of propellant, product, and loss of pressurization. The valve cup 10 may define a central opening through which a stem may extend. Positioned between a portion of the stem 14 and the valve cup 10 may be a gasket 16. The gasket 16 made be made from an elastomer, and traditionally, a cross linked elastomer, such as cross-linked vulcanized rubbers. The gasket 16 may be used to seal the interface between the valve cup 10 and the stem 14. The stem 18 may extend through the central opening in the valve cup 10 and engage a portion of the gasket 16. The portion of the stem that extends from the central opening of the valve cup towards the bottom of the outer container may engage a housing 12 and a spring 20. The portion of the stem 18 may push the spring 20 towards the bottom of the container to allow product to pass from the container and into the interior of the stem and out through the actuator 18. Upon release of the actuator 18, the spring may push the actuator in a direction away from the bottom of the container, which stops the release of material from inside the container to ambient. The spring 20 is typically made from metal. The spring 20 is supported by the housing 12.

Product delivery devices include bags, dip-tubes, and pistons. Where the product delivery device is a bag, the dispenser is generally configured so that the product is contained within the bag and the propellant is contained between the bag and the container. Where the product delivery device is a dip-tube, the dip-tube is generally in fluid communication with the valve and in direct contact with the product and/or propellant. Where the product delivery device is a piston, the dispenser is generally configured so that the product is contained between the piston and the valve and the propellant is contained between the piston and the bottom of the container.

Various types of actuators may be used to dispense product and/or propellant. For example, actuators may include button-actuators and trigger-actuators. Actuators generally include at least one component that interfaces the valve in fluid communication with a dispensing orifice.

To selectively dispense product from an aerosol dispenser, the valve assembly includes a number of different components. These components are made from a number of different materials including metal and polymer, which may be plastic, components.

Designing polymeric aerosol dispensers to be recycleable has traditionally been relatively complicated. Aerosol dispensers require the use of various different types of materials to, for example, adequately maintain pressure, selectively dispense product until the dispenser is empty, and safely depressurize when subject to relatively high temperatures and pressures. Further the joining of those materials to one another is also an important consideration to having an effective aerosol dispenser. However, the more diverse the types of materials and the more those diverse types of materials are joined to one another, the relatively more difficult that recycling the aerosol container may become.

Further, the recycling industry has set guidelines for the recyclability of polymeric containers, including polymeric aerosol dispensers. For example, the Association of Plastic Recyclers (APR) is a national trade association that represents companies who acquire, reprocess, and sell the output of more than 90 percent of the post-consumer plastic processing capacity in North America, and APR promotes developing protocols for the design of packaging for greater recyclability. The APR has set forth guidelines to obtain their recognition for containers, including aerosol containers. Further, there are other initiatives that focus on specific materials and how they are affected in the recycling stream.

For example, the European PET Bottle Platform (EPBP) is a voluntary industry initiative that provides PET bottle design guidelines for recycling, evaluates PET bottle packaging solutions and technologies, and facilitates understanding of the effects of new PET bottle innovations on the recycling process. To produce a recyclable and sustainable aerosol dispenser it is important that the aerosol dispenser components and assembly of those components makes it such that the aerosol dispenser complies with the recyclability industry guidelines.

For producing an aerosol dispenser that is both recyclable and economical, it may be desirable to have all the components made from a single class of recycle-able materials. However, the number of different component-properties required to produce a polymeric aerosol dispenser requires at least some varying types of materials.

Thus, it would be beneficial to provide an effective aerosol dispenser that included different materials that was recyclable and met the relatively higher recycling standard of the recycling industry, such as set forth by the APR and EPBP.

SUMMARY

In some embodiments, a polymeric aerosol dispenser for dispensing a product may include: a container comprising a closed end bottom and a neck longitudinally opposed to the closed end bottom, wherein the neck defines an opening, wherein the container comprises at least 90% by weight polyethylene terephthalate; and a valve assembly disposed in the container. The valve assembly may include: a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate; a valve stem extending through the inner passageway, wherein the valve stem comprises an outer stem surface and an inner stem surface opposite the outer stem surface, and wherein the valve stem is slidably engaged with a portion of the valve body; a valve seal separably joined to at least one of the valve body and the valve stem, wherein the valve seal has a valve seal density less than 1.0 g/cm$^3$, wherein the valve seal comprises a non-cross linked material, and wherein the valve seal is configured to operatively engage at least one of the valve body and the valve stem to form a seal therebetween; and a resilient member operatively engaged with the valve stem, wherein the resilient member is configured to control the movement of the valve stem, and wherein the resilient member has a resilient member density less than 1.0 g/cm$^3$. The aerosol dispenser may also include a product delivery device disposed within the container.

In some embodiments, a polymeric aerosol dispenser for dispensing a product may include: a container comprising a closed end bottom and a neck longitudinally opposed to the closed end bottom, wherein the neck defines an opening, wherein the container comprises at least 90% by weight polyethylene terephthalate; and a valve assembly disposed in the container. The valve assembly may include: a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate; a valve stem extending through the inner passageway, wherein the valve stem comprises an outer stem surface and an inner stem surface opposite the outer stem surface, and wherein the valve stem is slidably engaged with a portion of the valve body; a valve seal joined to at least one of the valve body and the valve stem, wherein the valve seal comprises thermoplastic elastomers; and a resilient member operatively engaged with the valve stem, wherein the resilient member is configured to control the movement of the valve stem, and wherein the resilient member has a resilient member density less than 1.0 g/cm$^3$. The aerosol dispenser may also include a product delivery device disposed within the container.

In some embodiments, a polymeric aerosol dispenser for dispensing a product may include: a container comprising a closed end bottom and a neck longitudinally opposed to the closed end bottom, wherein the neck defines an opening, wherein the container comprises at least 90% by weight polyethylene terephthalate; and a valve assembly disposed in the container. The valve assembly may include: a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate; a valve stem extending through the inner passageway, wherein the valve stem comprises an outer stem surface and an inner stem surface opposite the outer stem surface, wherein a portion of the valve seal operatively engages a portion of the outer stem surface, and wherein the valve stem is slidably engaged with a portion of the valve body; a valve seal separably joined to at least one of the valve body and the valve stem, wherein the valve seal has a valve seal density less than 1.0 g/cm$^3$; and a resilient member operatively engaged with the valve stem, wherein the resilient member is configured to control the movement of the valve stem, and wherein the resilient member has a resilient member density less than 1.0 g/cm$^3$. The aerosol dispenser may also include a product delivery device disposed within the container, and a base cup separably joined to the container, wherein the base cup has a base cup density less than 1.0 g/cm$^3$.

In some embodiments, a polymeric aerosol dispenser for dispensing a product may include: a container comprising a closed end bottom and a neck longitudinally opposed to the closed end bottom, wherein the neck defines an opening, wherein the container comprises at least 90% by weight polyethylene terephthalate; and a valve assembly disposed in the container. The valve assembly may include: a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate; a valve stem extending through the inner passageway, wherein the valve stem comprises an outer stem surface and an inner stem surface opposite the outer stem surface, wherein a portion of the valve seal operatively engages a portion of the outer stem surface, and wherein the valve stem is slidably engaged with a portion of the valve body; a valve seal separably joined to at least one of the valve body and the valve stem, wherein the valve seal has a valve seal density less than 1.0 g/cm$^3$, and wherein the valve seal is not cross-linked; and a resilient member operatively engaged with the valve stem, wherein the resilient member is configured to control the movement of the valve stem, and wherein the resilient member has a resilient member density less than 1.0 g/cm$^3$. The aerosol dispenser may also include a product delivery device disposed within the container, wherein at least a portion of the product delivery device comprises polyethylene terephthalate; and a base cup joined to the container, wherein the base cup comprises polyethylene terephthalate.

BRIEF DESCRIPTION OF THE DRAWINGS

Several figures are provided to help the reader understand the invention. The figures are intended to be viewed in conjunction with the specification and are not intended to be limiting beyond that of the wording of the specification. Reference numbers are used to identify different features of the figures. The same reference numbers are used throughout the specification and drawings to show the same features, regardless of the variation of the invention that is depicted.

FIG. 4A is a partial, exploded, sectional view of a valve assembly, a product delivery device, and a container.

FIG. 4B is a partial, section view of a valve assembly, a product delivery device, and a container.

FIG. 7A is a perspective, sectional view of a valve assembly.

FIG. 7B is a side, exploded, sectional view of a valve assembly.

DETAILED DESCRIPTION

Figure 1:
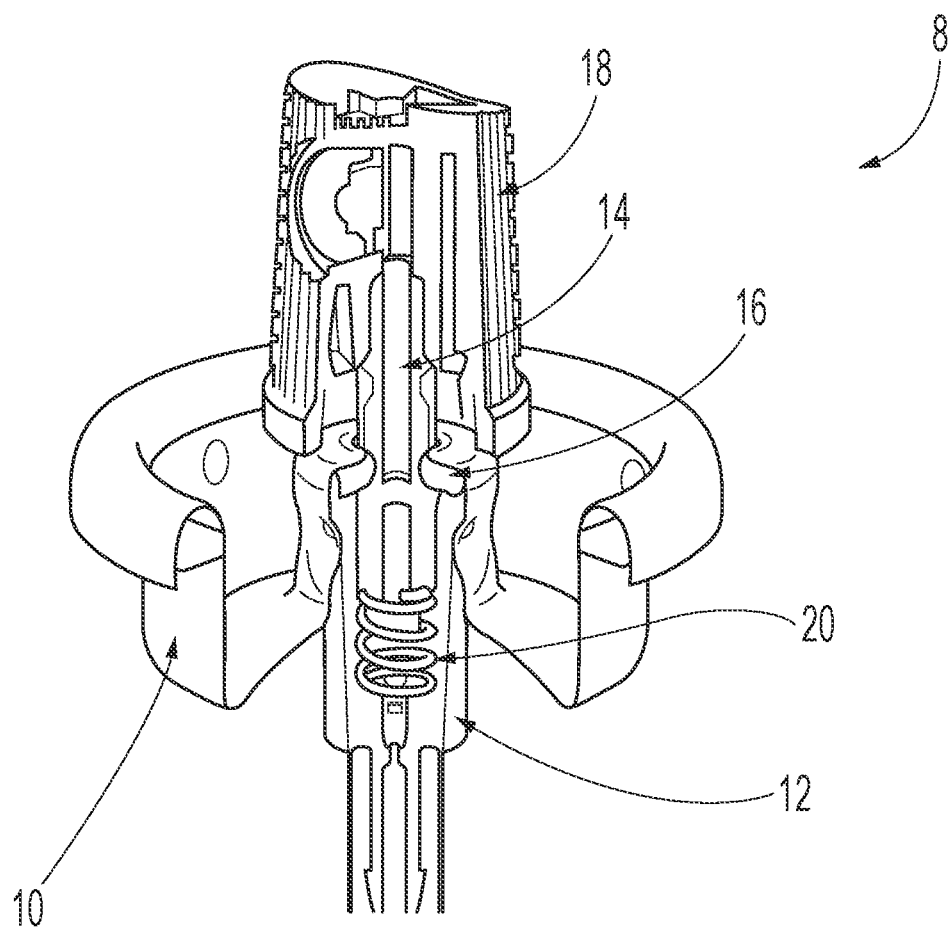
FIG. 1 is a sectional view of a prior art, industry standard valve assembly including a metal valve cup.
Figure 2B:
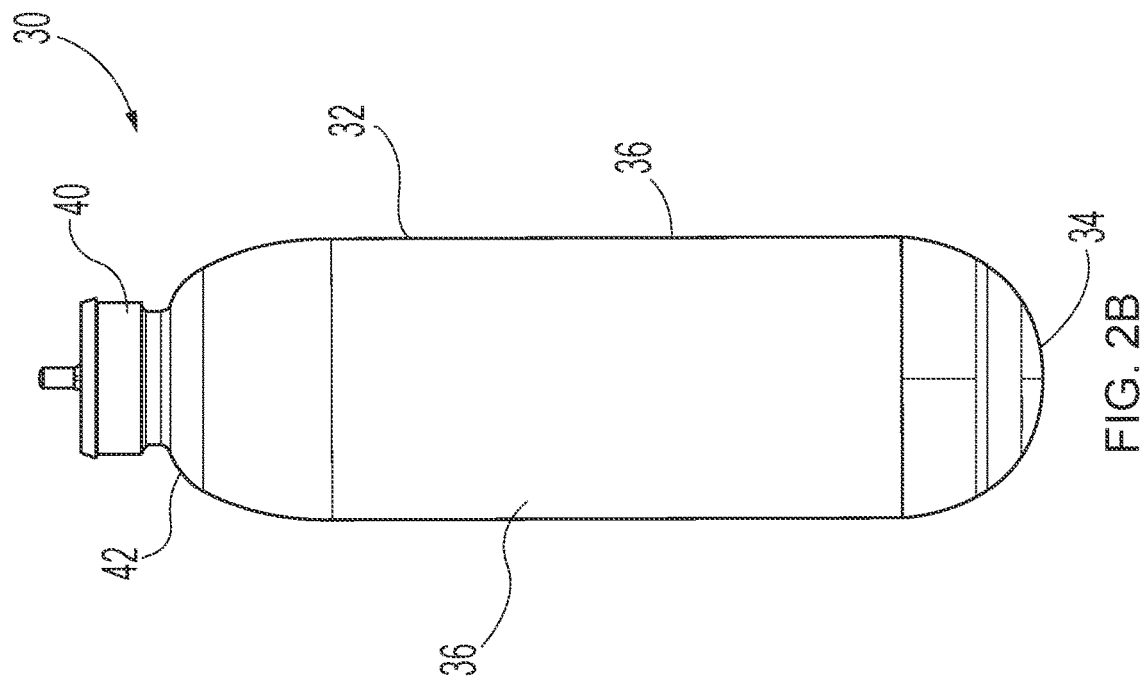
FIG. 2B is a side view of an aerosol dispenser.
Figure 2A:
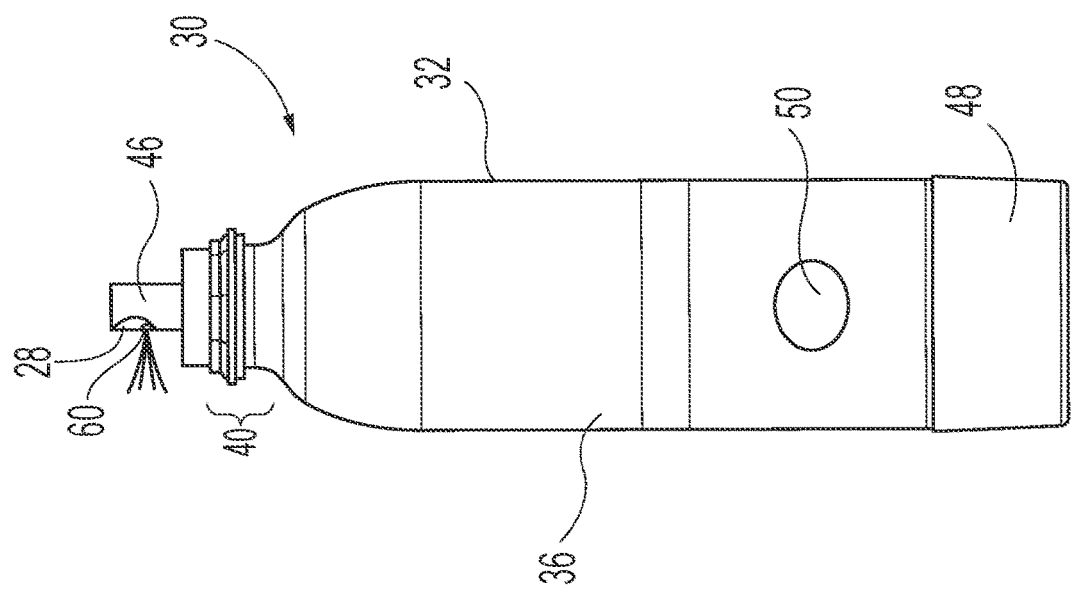
FIG. 2A is a side view of an aerosol dispenser.

The present disclosure is directed to an aerosol dispenser and, more specifically, a recyclable polymeric aerosol dispenser. An aerosol dispenser may include a container for containing a product and/or a propellant and a valve assembly for dispensing the product or the product and the propellant from the container. Other components may be included in the aerosol dispenser such as a nozzle for controlling the spray characteristics of a product as it discharged from the aerosol dispenser and an actuator for selectively dispensing product from the aerosol dispenser. Products may include, but are not limited to: shave cream, shave foam, body sprays, body washes, perfumes, hair cleaners, hair conditions, hair styling products, antiperspirants, deodorants, personal and household cleaning or disinfecting compositions, air freshening products, fabric freshening products, hard-surface products, astringents, foods, paint, pharmaceuticals, and insecticides. The relatively large number of products that may be dispensed using aerosols has made aerosols a popular choice among manufacturing companies. The relative popularity of aerosol dispensers has resulted in companies considering cost cutting measures with respect to aerosol dispensers and to consider materials, at least in part, for aerosol dispensers to minimize the environmental impact and increase compatibility with the recycling process. For example, an aerosol dispenser made from polymeric components may aid in the recyclability of the dispensers and help with reducing cost, such as by reducing the cost of manufacturing, eliminating expensive metal components, and reducing the cost of shipping, through weight reduction of each dispenser. The use of different materials also allows for greater flexibly in the size and shape of the dispenser.

The present disclosure is directed to a recyclable polymeric aerosol dispenser including all polymeric components. These components being selectively either fixedly joined or separably joined based on the material composition of the component. Further, components may be selected for their density and, thus, their ability to float or sink during the recycling process. The recyclable polymeric aerosol dispenser is designed to minimize its impact on the PET recycling stream and to align with industry recyclability guidelines. The present disclosure is directed to an aerosol dispenser that may be recycled and through that recycling process meets the guidelines as set forth by the APR and EPBP.

With reference to FIGS. 2A, 2B, 3A, and 3B, an aerosol dispenser 30 may include a container 32, a valve assembly 52 (also referred to herein as a valve), a product delivery device 56, and an actuator 46. The container 32 may include a base cup 48 joined thereto and indicia 50 disposed on, for example, the sidewalls 36 of the container 32. The valve assembly 52 may be joined to a portion of the container 32. By joined includes directly or indirectly joined. Joined includes separably joined and fixedly joined. Separably joined means that two or more components will separate from one another when subject to the recycling process. Fixedly joined means that two or more components will not separate from one another when subject to the recycling process. Joined includes both mechanical attachment, such as by screws, bolts, interference fit, friction fit, welding, and integrally molding, and chemical attachment, such as by adhesive or the adhesive properties inherent in the materials being attached. The valve assembly 52 may be joined to the container such that a portion of the valve assembly 52 is disposed within the container. The product delivery device 56 may be joined to at least one of a portion of the container 32 and a portion of the valve assembly 52 and the product delivery device may be in fluid communication with the actuator 46.

With reference to FIGS. 2A, 2B, 3A, 3B, and 3C, the container 32 may be used to hold product and/or propellant. The container 32 may be any shape that allows product and/or propellant to be held within the interior of the container. For example, the container may be peanut-shaped, oval-shaped, or rectangular-shaped. It is to be appreciated that the container 32 may be molded, which allows for any number of shapes to be used. The container 32 may be longitudinally elongate such that the container has an aspect ratio of a longitudinal dimension to a transverse dimension, such as diameter. The aspect ratio may be greater than 1, equal to 1, such as in a sphere or shorter cylinder, or an aspect ratio less than 1. The containers 32 may be cylindrical.

The container 32 may include a closed bottom 34, one or more sidewalls 36, and a neck 40. The one or more sidewalls 36 may extend between the closed bottom 34 and the neck 40. The sidewalls 36 define the shape of the container 32. A shoulder 42 may be included between the neck 40 and the one or more sidewalls 36. The neck 40 of the container 32 may define an opening 38. The opening 38 may be opposite the bottom 34 of the container 32. The neck 40 and/or shoulder 42 may have a uniform or varying thickness or crystallinity in order to achieve a desired strength in these regions of the container 32.

The bottom 34 of the container 32 may be configured for resting on horizontal surfaces such as shelves, countertops, tables etc. The bottom 34 of the container 32 may include a re-entrant portion or base cup 48. The base cup 48 may be joined to the bottom 34 of the container 32 and may aid in reinforcement of the bottom 34 and/or may allow the container to rest on horizontal surfaces. The container 32 may not include a base cup and may be configured to sit on at least a portion of the bottom 34. Suitable shapes of the bottom 34 include petaloid, champagne, hemispherical, seat-ring, or other generally convex shapes. Each of these shapes of the bottom 34 may be used with or without a base cup 48.

The container 32 may be polymeric. The container 32 may include polyethylene terephthalate (PET), polyethylene furanoate (PEF), polyester, nylon, polyolefin (such as PP and PE), EVOH, or mixtures thereof. The container may be a single layer or multi-layered. The container 32 may be injection molded or further blow molded, such as in an injection-stretch blow molding process or an extrusion blow molding process. It is to be appreciated that the material, such as PET, described herein may be virgin material or recycled material.

The container 32 may be axisymmetric as shown, or, may be eccentric. The cross-section may be square, elliptical, irregular, etc. Furthermore, the cross section may be generally constant as shown, or may be variable. For a variable cross-section, the container may be, for example, barrel shaped, hourglass shaped, or monotonically tapered.

The container 32 may range from about 6 cm to about 60 cm, or from about 10 cm to about 40 cm in height, taken in the axial direction. The container 32 may have a cross-section perimeter or diameter, if a round cross-section is selected, from about 3 cm to about 60 cm, or from about 4 cm to about 10 cm. The container may have a volume ranging from about 40 cubic centimeters to about 1000 cubic centimeters exclusive of any components therein, such as a product delivery device 56.

At 21° C., the container 32 may be pressurized to an internal gage pressure of about 100 kPa to about 1500 kPa, or from about 110 kPa to about 1300 kPa, or from about 115 kPa to about 490 kPa, or about 270 kPa to about 420 kPa using a propellant. An aerosol dispenser 30 may have an initial propellant pressure of about 1500 kPa and a final propellant pressure of about 120 kPa, an initial propellant pressure of about 900 kPa and a final propellant pressure of about 300 kPa, or an initial propellant pressure of about 500 kPa and a final propellant pressure of 0 kPa, including any values between the recited ranges.

The container is made from a material including polyethylene terephthalate (PET). The majority of the material from which the container is made is PET, though the container material may also include low-level additives to facilitate processing. For example, the PET material comprising the container may include low-level additives such as a re-heat additive (e.g. carbon black), colorants/opacifiers (including on the container and part of the material of the container), UV additives, anti-static agents, and mold-release agents. The container material may include at least about 90% by weight PET, at least about 92.5% by weight PET, at least about 95% by weight PET, at least about 98% by weight PET. The percent weight of PET does not include decoration that may be disposed on the container.

The container includes the bulk of the material to be reclaimed during recycling. Thus, the extent to which any of the other components of the dispenser are joined to the container may affect the recyclability of the container. Those components that are separably joined may be separated from the container during the recycling process. Those components that are fixedly joined may not be separated from the container during the recycling process. For example, the valve body may be fixedly joined to the container (e.g. welded to the container), and therefore not separate from the container during the recycling process.

The container contains the product and the propellant. The propellant may include hydrocarbons, compressed gas, such as nitrogen and air, hydro-fluorinated olefins (HFO), such as trans-1,3,3,3-tetrafluoroprop-1-ene, and mixtures thereof. Propellants listed in the US Federal Register 49 CFR 1.73.115, Class 2, Division 2.2 may be acceptable. The propellant and/or the product may be non-flammable. The propellant may be condensable. A condensable propellant, when condensed, may provide the benefit of a flatter depressurization curve at the vapor pressure, as product is depleted during usage. A condensable propellant may provide the benefit that a greater volume of gas may be placed into the container at a given pressure. Generally, the highest pressure occurs after the aerosol dispenser is charged with product but before the first dispensing of that product by the user.

The valve assembly 52 may be in fluid communication with the actuator 46. The actuator 46 may include an orifice cup 28 that defines a nozzle 60. The nozzle 60 directs product out of the aerosol dispenser and into the environment or onto a target surface. The nozzle may be configured in various different ways depending upon the desired dispensing and spray characteristics.

The actuator 46 may be engaged by a user and is configured to initiate and terminate dispensing of the product and/or propellant. Stated another way, the actuator provides selective dispensing of the product and/or propellant. The actuator 46 may be depressible, operable as a trigger, push-button, and the like, to cause release of a product from the aerosol dispenser 30.

The orifice cup 28 is typically a high-rigidity plastic material with precise channeling required to ensure the nozzle operates as desired. Materials-of-construction for orifice cups may include materials with a density of less than about 1.0 g/cm$^3$. The orifice cup may be constructed from a material with a density of greater than about 1.0 g/cm$^3$ and therefore may not be entirely separable from the PET during the recycling process, such as the floating step. In this latter instance, the total mass of the orifice cup should be minimized versus the total mass of PET in the dispenser. For example, the orifice cup may comprise less than about 1%, or less than about 0.5% or less than about 0.2% or less than about 0.1% of the mass of PET in the aerosol dispenser. The orifice cup 28 defines the nozzle 60. The nozzle generally determines the spray-pattern achieved when the aerosol dispenser is in the dispensing configuration and may include such variations as the dispersion of the spray, the droplet-size of the spray, multiple-streams, and the like.

The actuator 46 may include a connector such as a male or female connector, snap-fit connector, or the like to secure the actuator to the container. The actuator may be separably joined to the container or the valve assembly. The actuator 46 may have an actuator density. The actuator density may be less than or greater than 1 g/cm$^3$. The actuator may be made from a material including polypropylene (PP). The actuator may be made from a material including PET. The actuator may also include polyethylene furanoate (PEF), polyester, nylon, polyolefin (such as PE), EVOH, or mixtures thereof.

It is to be appreciated that to dispense product, the aerosol dispenser does not need to include an actuator. The product and/or propellant may be dispensed from the stem.

Figure 3B:
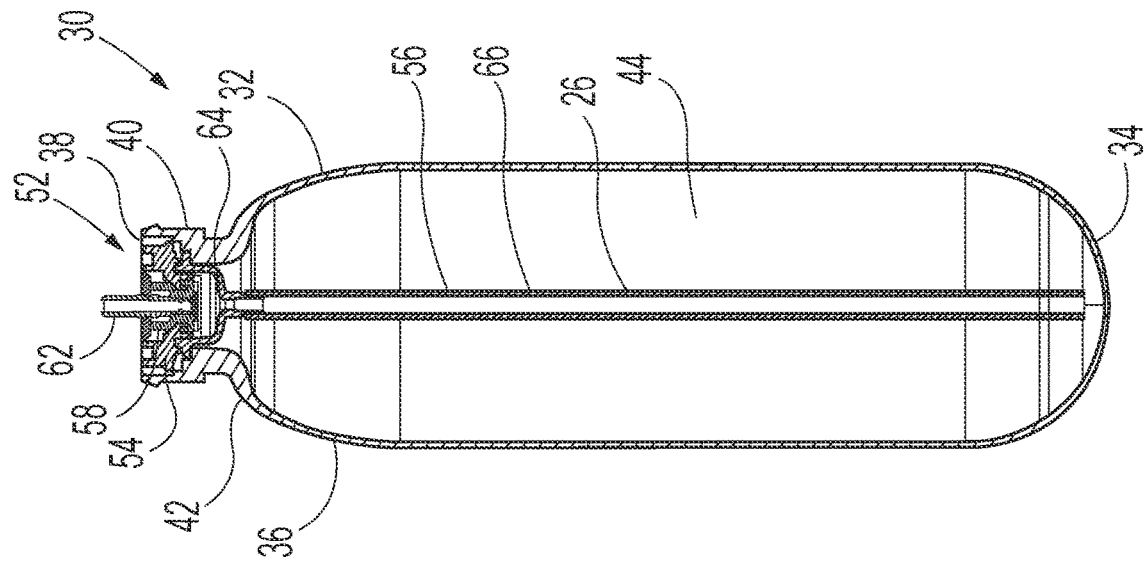
FIG. 3B is a sectional view of an aerosol dispenser including a dip tube.
Figure 3A:
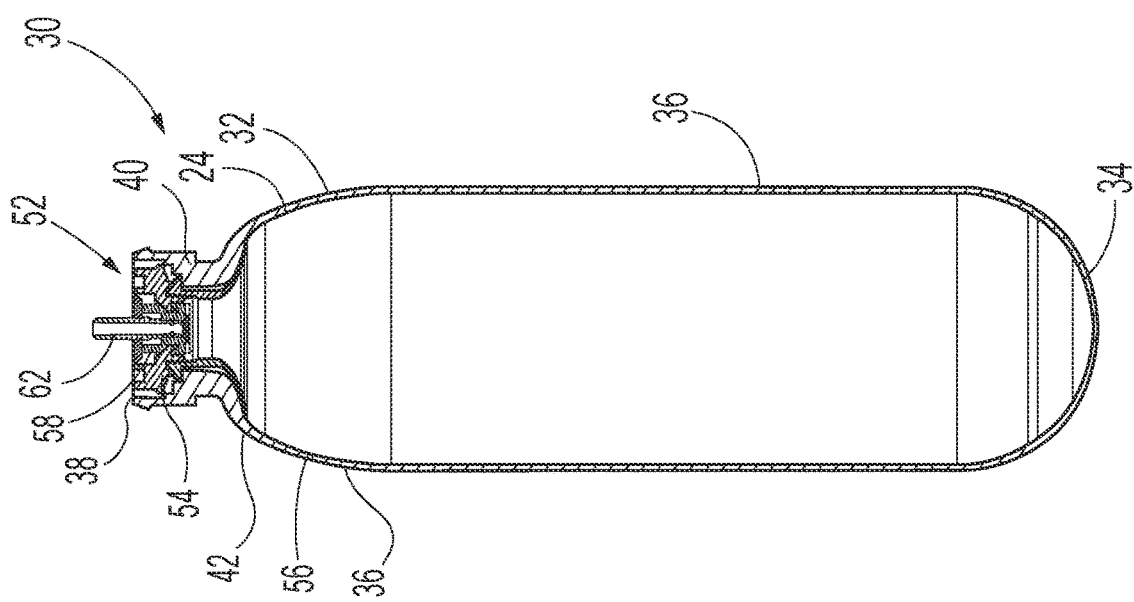
FIG. 3A is a sectional view of an aerosol dispenser including a bag.

The product delivery device 56 may be used to contain and/or provide for delivery of product and/or propellant from the aerosol dispenser 30 upon demand. Suitable product delivery devices 56 include a piston, a bag 24, or a dip tube 26, such as illustrated in FIGS. 3A and 3B. The product delivery device 56 may include polyethylene terephthalate (PET), polypropylene (PP), polyethylene furanoate (PEF), polyester, nylon, polyolefin, EVOH, HDPE (high-density polyethylene), LDPE (low density polyethylene), LLDPE (linear low density polyethylene), or mixtures thereof. The container may be a single layer or multi-layered. It is to be appreciated that the PET included in the product delivery device may have different properties, such as, for example, intrinsic viscosity, than the PET included in the container. Where the product delivery device includes a bag, the bag 24 may be disposed within the container 32 and be configured to hold a product therein, such as illustrated in FIG. 3A. Propellant may be disposed within the container 32 and between the container and the bag 24. A portion of the bag 24 may be joined to at least one of the container 32 and a portion of the valve assembly 52, such as the valve body 54. The bag 24 may be positioned between the container 32 and the valve body 54. The bag 24 may be inserted into the container 32 and subsequently joined thereto. The bag 24 may be joined to the valve body 54, and the valve body 54 joined to the bag 24 may be subsequently inserted into the container 32. The bag 24 may include a lubricant. The lubricant may be water-soluble such that the lubricant does not adversely affect the recyclability of the aerosol dispenser. An example lubricant include Lusin Lub O 32 F, available from Chem Trend, Howell, Mich.

As illustrated in FIG. 3B, the dispenser may include dip tube 26. The dip tube 26 may include a tube 66 and a dip tube adaptor 64. The dip tube adaptor 64 may be disposed within the container 32. The dip tube adaptor 64 may engage a portion of the neck 40. The dip tube 26 may be joined to the dip tube adaptor 64 and extend from the dip tube adaptor 64 toward the bottom 34 of the container 32. It is to be appreciated that the dip tube 26 may be joined to a portion of the valve assembly, such as the valve body 54. The dip tube 26 and/or the dip tube adaptor 64 may be joined to the valve body 54 prior to being disposed within the container. The dip tube 26 and/or the dip tube adaptor 64 may be disposed within the container and then subsequently joined to a portion of the container and/or the valve body 54. The tube 66 may be joined to the dip tube adaptor 64.

The product delivery device 56 may include a metering device for dispensing a pre-determined, metered quantity of product. The product delivery device 56 may include, for example, an inverting valve such as a valve including a ball therein to alter the path of product flow. The product delivery device 56 may include a dip tube disposed in a bag. The product delivery device 56 may be polymeric.

Figure 3C:
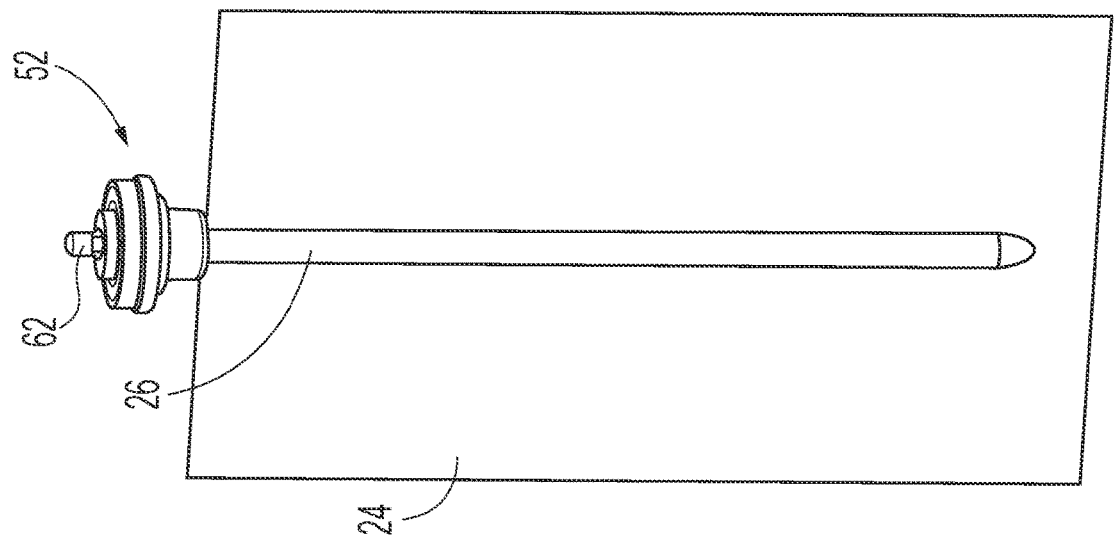
FIG. 3C is a sectional view of an aerosol dispenser including a bag and a dip tube.
Figure 3D:
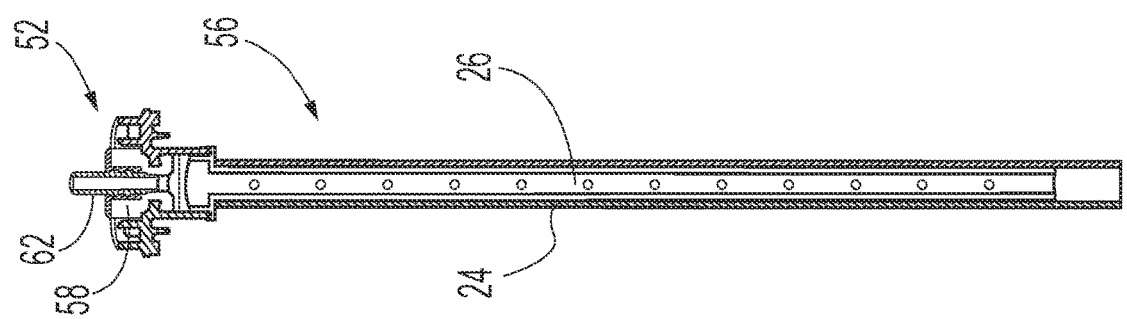
FIG. 3D is a sectional view of a dip tube joined to a valve assembly and a bag wrapped about the dip tube.
Figure 3E:
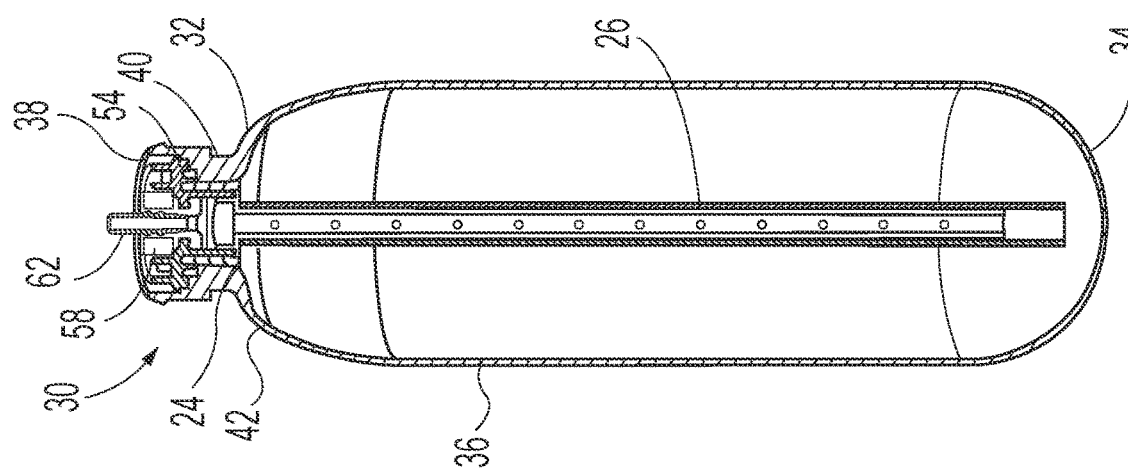
FIG. 3E is a perspective view of a dip tube joined to a valve assembly and an extended bag.

Referring to FIGS. 3C-3E, the product delivery device 56 may include a dip tube 26 and a bag 24. The bag 24 may be attached to a portion of the dip tub 26 and the dip tube may be disposed within the bag 24. The dip tube 26 may include one or more orifices through which product may flow. A portion of the dip tube 26 may be joined to a portion of the valve assembly 54. A portion of the dip tube 26 may be joined to a portion of the valve body 54. The dip tube 26 may be joined to a portion of the valve body 54 by friction fit, snap fit, chemical attachment, such as by adhesive, or mechanical attachment, such as by a screw or nail. Prior to the valve assembly 52, the dip tub 26, and the bag 24 being joined to the container 32, the bag 24 may be wrapped about the dip tub 26, such as illustrated in FIG. 3D, or collapsed in some other manner such that the bag 24 does not interfere as the dip tube 26 and bag 24 are inserted into the container 32. Once the bag 24 and dip tube 26 are disposed within the container 32, the bag 24 may expand within the container.

The container 32, and/or optionally the product delivery device 56 may be transparent or substantially transparent. This arrangement provides the benefit that the consumer knows when product is nearing depletion and allows improved communication of product attributes, such as color, viscosity, etc. Also, indicia disposed on the container, such as labeling or other decoration of the container, may be more apparent if the background to which such decoration is applied is clear. Labels may be shrink wrapped, printed, etc., as are known in the art.

The product delivery device 56 may be positioned between the valve assembly 52 and the container 32. The product delivery device 56 and the valve assembly 52 may be disposed, at least in part, in the neck of the container 32. For example, such as illustrated in FIGS. 4A and 4B, the dip tube 26, including the tube 66 and the dip tube adapter 64 may be disposed in the container such that a portion of the dip tube 26, such as the tube 66, extends into the container and the dip tube adaptor 64 is joined to the neck 40 of the container 32. The valve assembly 52 may be disposed on a portion of the dip tube adaptor and a portion of the neck 40. The dip tube and the valve assembly are in fluid communication. Similarly, a bag 24 may be disposed in the container such that a portion of the bag 24 is joined to the neck 40 of the container 32 and a portion of the bag 24 extends into the container 32. The valve assembly 52 may be disposed on a portion of the bag 24 and a portion of the neck 40. The bag and the valve assembly are in fluid communication.

Where the product delivery device is a bag or a dip-tube, it may be desirable to have the product delivery device joined to the valve body, to ensure complete and even flow of product/propellant from the dispenser. When the product delivery device is a bag, the bag includes a material having at least about 90% by weight PET, at least about 92.5% by weight PET, or at least about 95% by weight PET, and the product delivery device may be joined to at least one of the valve body and the container. The product delivery device may include a bag and a separate, bag-adapter. The bag adapter may be fixedly joined to at least one of the valve body and the container. The bag-adapter may be made from a material including at least about 90% by weight PET, at least about 92.5% by weight PET, or at least about 95% by weight PET, and the bag may include a different material and be separably joined, such as by, for example, friction-fit or snap-fit, to the bag-adapter.

Where the product delivery device is a dip-tube, the product delivery may include at least about 90% by weight PET, at least about 92.5% by weight PET, or at least about 95% by weight PET, and the product delivery device may be joined to at least one of the valve body and the container. The product delivery device may include a dip tube. The dip tube may include a tube and a dip-tube adapter where the dip-tube adapter is fixedly joined to at least one of the valve body and the container. The dip-tube adapter may be made from a material including at least about 90% by weight PET, at least about 92.5% by weight PET, or at least about 95% by weight PET, while the tube may comprise a different material and be separably joined, such as by, for example, friction-fit or snap-fit, to the dip tube adapter.

Where the product delivery device is a piston, the product delivery device is generally separably joined to the dispenser as the piston must be slide-able within the dispenser to convey product out from the dispenser.

The product delivery device 56 may have a delivery device density. The delivery device density may be less than or greater than 1.0 g/cm³. More specifically, any portion of the product delivery device that includes a material that does not include PET may be separably joined to at least one of the valve body and the container and may have a density of less than about 1.0 g/cm³.

The container 32 may include a neck 40. The neck 40 may define an opening 38 and be configured to receive a valve assembly 52. The valve assembly 52 may be inserted, at least partially, into the opening 38 of the neck 40 of the container 32, such as illustrated in FIGS. 3A, 3B, and 3C. The valve assembly 52 may include a valve body 54, a valve stem 62, a valve seal 82, and a resilient member 58. At least a portion of the valve assembly 52 may be movable in relationship to the balance of the aerosol dispenser in order to open and close the aerosol dispenser for dispensing and containing product. The valve assembly 52 may be opened due to movement of the valve stem 62 which may be through use of an actuator 46 or through manual or other mechanical depression of the valve stem 62. When the valve 52 is opened, for example, by way of the actuator 46, a flow path is created for the product to be dispensed through a nozzle 60 to ambient or a target surface. The valve assembly 52 may be opened, for example, by selective actuation of the actuator 46 by a user.

A portion of the valve body 54 may be sealed to the neck of the container 32, such as illustrated in FIGS. 3A, 3B, and 3C, to prevent the escape of propellant, product, and the loss of pressurization. The valve body 54 may be sealed to the container 32 utilizing a press fit, interference fit, screw-in, crimping, solvent welding, laser welding, sonic welding, ultrasonic welding, spin welding, adhesive or any combination thereof, so long as a seal adequate to maintain the pressure results. Screw-in sealing may include threads on both the valve body 54 and the neck of the container 32. Threading configurations may include internal threading (where the container threads are on the interior of the neck portion, and the valve body sits within the threaded region) and external threading (where the container threads are on the exterior of the neck portion, and the valve body overlays the neck portion to engage the threads). The threading configuration may require multiple rotations of the valve body relative to the neck portion of the container in order to form the seal or the seal may be formed with less than a single full rotation. One example of a threaded fit that does not require a full rotation is a bayonet seal. The threading configuration may further include an anti-rotation feature such as that disclosed in [[[cases 14942-45]]]

The seal may be further enhanced by a gasket intermediate the valve body 54 and the neck portion of the container 32. The gasket may be made from one or more materials including thermoplastic elastomers (TPE), silicone, rubber, or polymers, any of which may be foamed. The gasket may have a density less than 1.0 g/cm³. The thermoplastic elastomer (TPE) may be a styrenic block copolymer (TPS), thermoplastic polyolefin elastomer (TPO), thermoplastic elastomer vulcanizate (TPV), thermoplastic polyurethane elastomer (TPU), thermoplastic copolyester elastomer (TPC), thermoplastic polyamide elastomer (TPA), non-classified thermoplastic elastomer (TPZ), and combinations thereof. The thermoplastic elastomer may be a non-cross linked elastomer. The gasket may be removably joined to the valve body 54 and/or the container 32.

The valve body 54 may be joined to the container 32 such that at least a portion of the valve body 54 is disposed within the container 32. The valve body 54 may be joined to the container 32 such that the valve body 54 is joined to the opening of the neck and the valve body 54 is disposed on top of the neck.

As illustrated in FIGS. 4A and 4B, the valve body 54 may extend about a longitudinal axis 70. The valve body 54 may include an outer surface 72 and define an inner passageway 74. The outer surface 72 may include the surface positioned farthest from the longitudinal axis 70. The outer surface 72 may extend about the longitudinal axis 70. The inner passageway 74 may include a first passageway opening 76 and a second passageway opening 78 and a passageway surface 80 extending from the first passageway opening 76 to the second passageway opening 78. The passageway surface 80 may substantially surround the longitudinal axis 70.

Figure 5A:
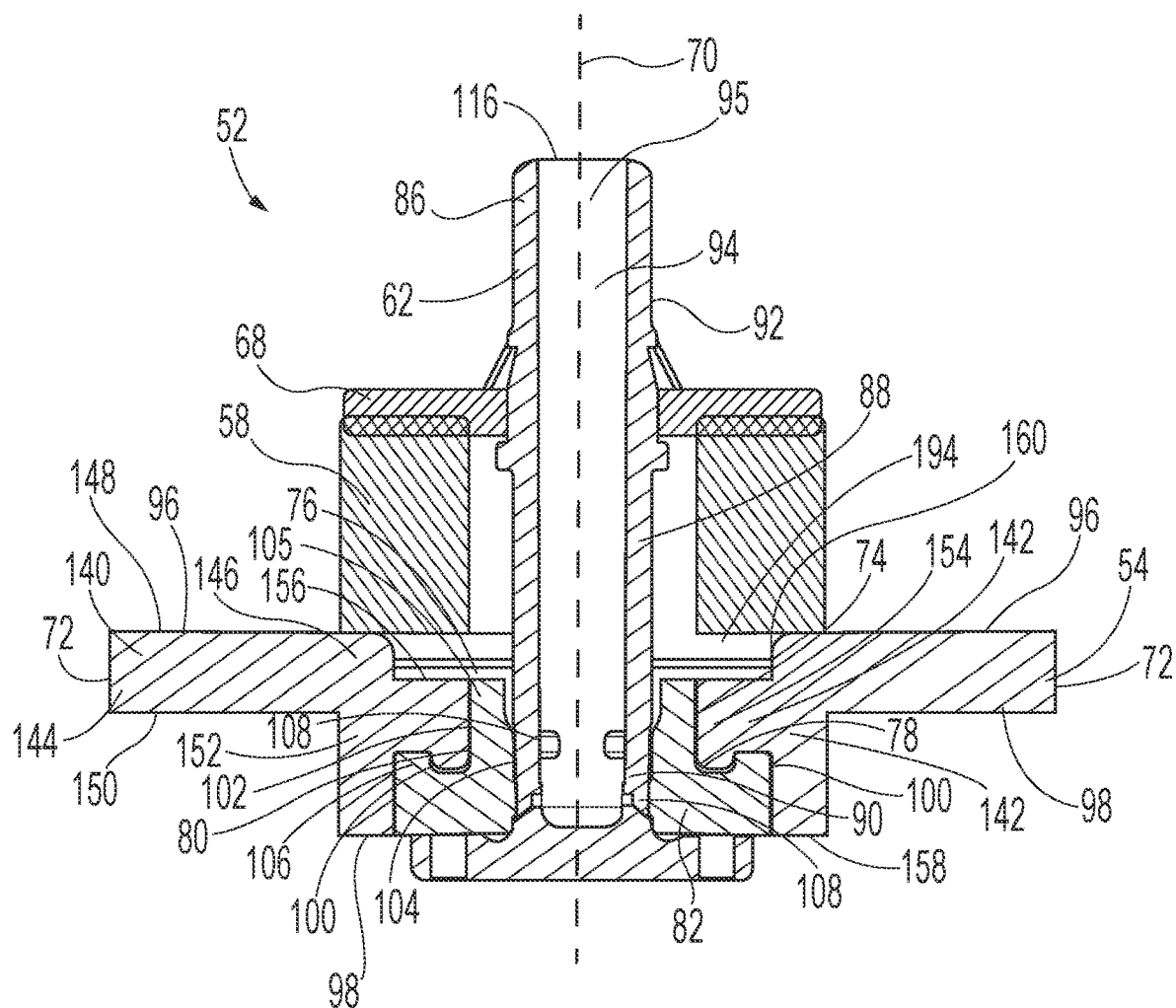
FIG. 5A is a sectional view of a valve assembly.
Figure 5B:
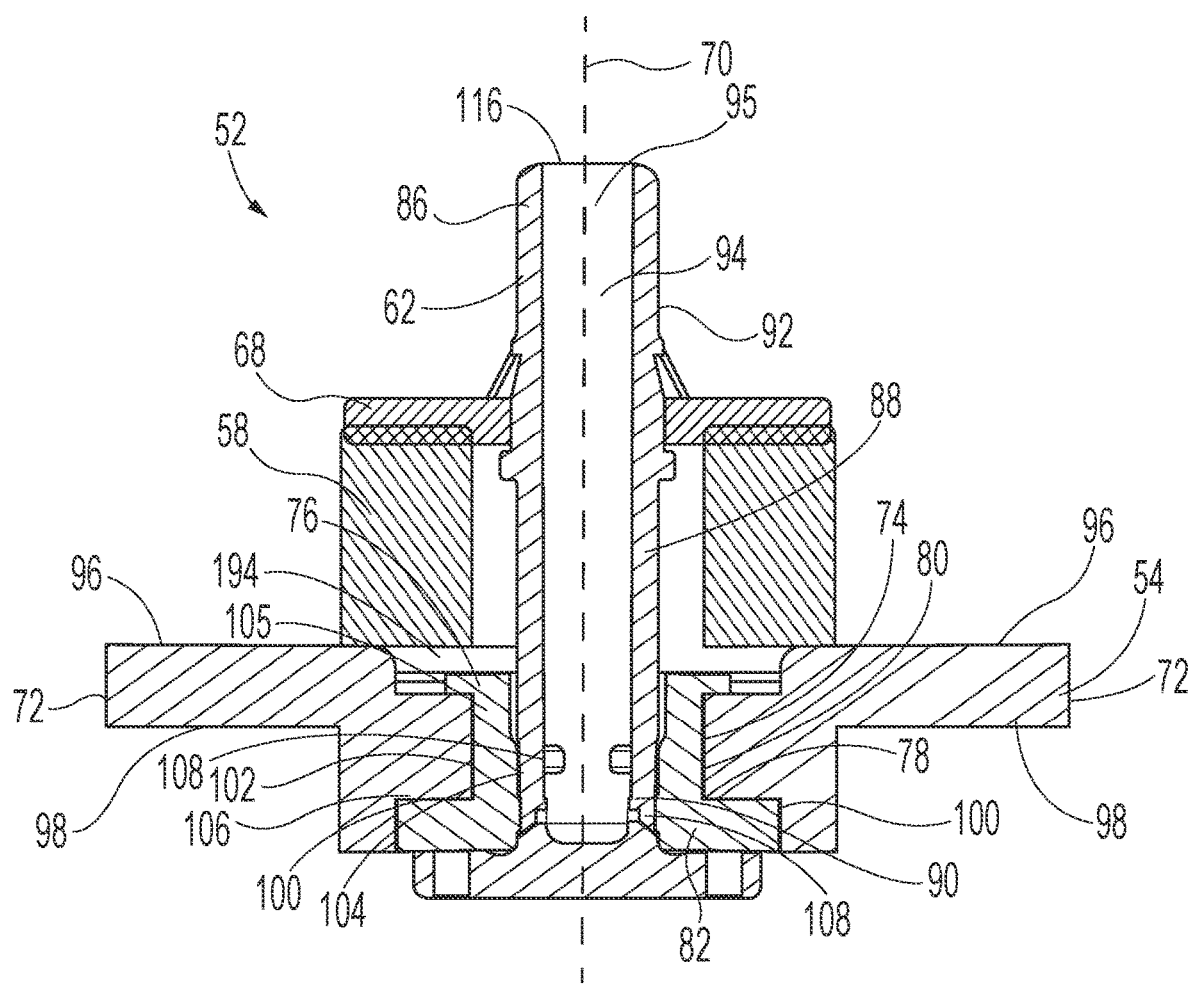
FIG. 5B is a sectional view of a valve assembly.

Referring to FIGS. 5A and 5B, the valve assembly 52 may include a valve body 54. The valve body 54 includes an outer surface 72 and an inner passageway 74 extending about a longitudinal axis 70. As previously discussed, the inner passageway 74 includes a first passageway opening 76, a second passageway opening 78, and a passageway surface 80 extending from the first passageway opening 76 to the second passageway opening 78. The valve body 54 may include a first valve body surface 96 and a second valve body surface 98 opposite the first valve body surface 96. The valve body surfaces may extend from the outer surface 72 of the valve body to the inner passageway 74. The valve body surfaces may have any geometry such that the valve body may be joined to the container and an adequate seal may be maintained. As illustrated in FIG. 5A-5B, the surface may include a step portion, also referred to herein as a transition portion, such that the first surface is not continuously planar from the outer surface to the inner passageway.

With reference to FIG. 5A, the valve body 54 may include a first hoop member 140 and a second hoop member 142. The first hoop member may extend about the longitudinal axis. The first hoop member may include a first hoop outer portion 144 positioned adjacent the inner neck portion, a first hoop inner portion 146 opposite to the first hoop outer portion 144, a first hoop upper surface 148, and a first hoop lower surface 150 opposite to the first hoop upper surface. The valve body 54 may include a second hoop member 142 including a second hoop outer portion 152, a second hoop inner portion 154, a second hoop upper surface 156, and a second hoop lower surface 158. The second hoop inner portion 154 extends about the longitudinal axis 70. A portion of the second hoop member 142 defines the inner passageway 74.

The first hoop member 140 may be joined to the second hoop member 142. A portion of the second hoop upper surface 156 may be joined to a portion of the first hoop lower surface 150. The first hoop member 140 may be joined to the second hoop member 142 such that a transition portion 160, also referred to herein as a step portion, is formed between the first hoop member and the second hoop member. The transition portion 160 may be positioned between the first hoop upper surface and the second hoop upper surface.

The valve body 54 may include a valve body cavity 100, such as illustrated in FIGS. 5A and 5B. The valve body cavity 100 is a cavity defined by a portion of the valve body 54 and may be positioned between the inner passageway 80 and the outer surface 72. The valve body cavity 100 may be positioned adjacent to the inner passageway 80 so that a portion of the valve seal 82 may extend from the inner passageway 80 and into the valve body cavity 100. The valve body cavity 100 may extend, either partially or wholly, about the longitudinal axis 70. The valve body cavity 100 may extend from the second valve body surface 98 towards the first valve body surface 96. The valve body cavity 100 may extend from the inner passageway 80 toward the outer surface 72 of the valve body 54. The valve body cavity 100 may be any shape such that a portion of the valve seal may be disposed within at least a portion of the valve body cavity 100.

The second hoop member 142 may include the valve body cavity 100, such as illustrated in FIG. 5A. The valve body cavity may extend from a portion of the second hoop lower surface 158 toward the second hoop upper surface 148. It is to be appreciated that the valve body cavity 100 may extend in a direction substantially perpendicular to a portion of the second hoop lower surface 158 or at an angle to the second hoop lower surface 158. The valve body cavity 100 may extend through the second hoop member and into a portion of the first hoop member.

It is also to be appreciated that the first hoop member 140 may include the valve body cavity 100 or a portion thereof.

The valve body cavity 100 may be configured to accept a portion of the valve seal 82. More specifically, a portion of the valve seal 82 may extend from the inner passageway 80 about the second passageway opening 78 and into at least a portion of the valve body cavity 100. The valve seal 82 includes a valve seal first end portion 105 and a valve seal second end portion 106. The valve seal first end portion 105 may be disposed within the inner passageway 80. The valve seal second end portion 106 may be opposite the valve seal first end portion 105. At least a portion of the valve seal second end portion 106 may be disposed within the valve body cavity 100. At least a portion of the valve seal second end portion 106 may be substantially surrounded by the valve body cavity 100. The valve body cavity 100 protects the valve seal second end portion 106 from separating from the valve body 54 under intended operating conditions. The valve body cavity 100 prevents propellant and/or product from coming into contact with the valve seal second end portion 106 and thereby separating the valve seal from the valve body and allowing product and/or propellant to be released from the container unintentionally. Further, for a valve seal that is separably joined to the valve body, the valve body cavity may aid in maintaining the position of the valve seal with respect to the valve body when the dispenser is in use.

Figure 6B:
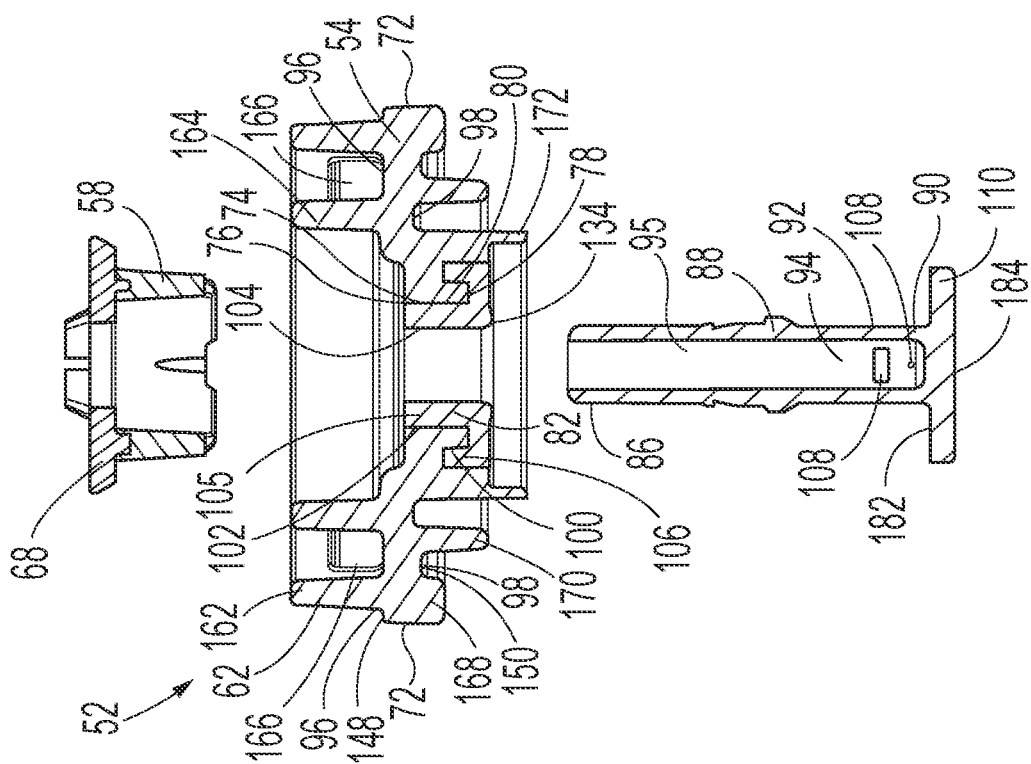
FIG. 6B is a side, exploded, sectional view of a valve assembly.
Figure 6A:
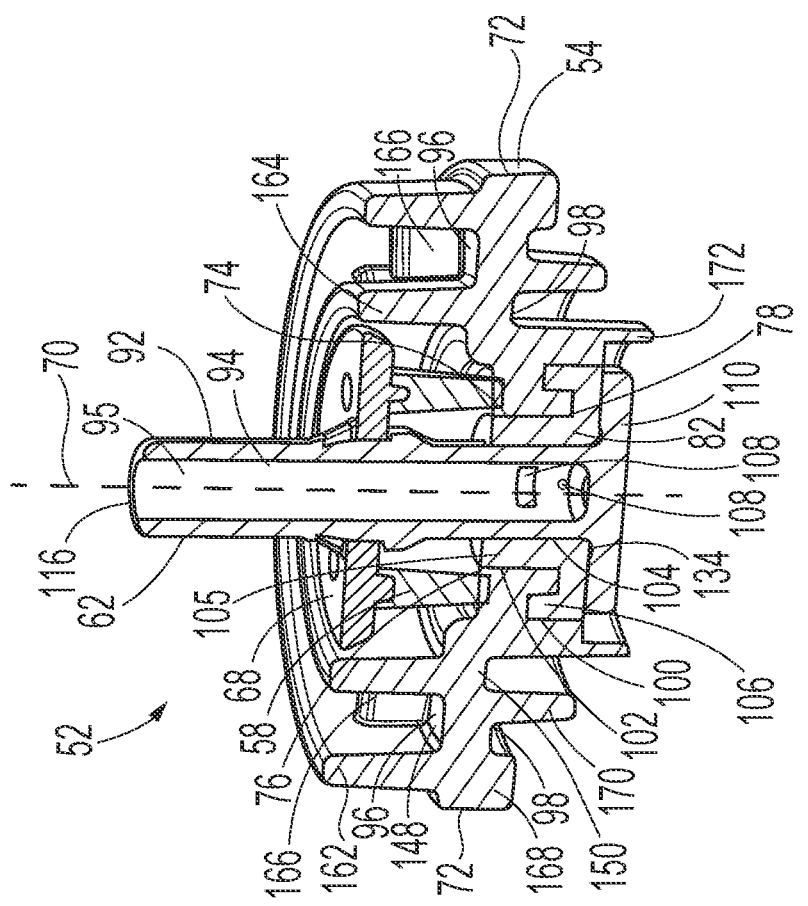
FIG. 6A is a perspective, sectional view of a valve assembly.

As illustrated in FIGS. 6A and 6B, the valve body 54 may include one or more members that extend from at least one of the first valve body surface 96 and the second valve body surface 98. The valve body 54 may include a first brace member 162. The first brace member 162 may be joined to the first valve body surface 96 and extend away from the first valve body surface 96. The first brace member 162 may extend continuously or discontinuously about the inner passageway 74. An actuator or other dispensing component may be joined to a portion of the first brace member 162.

The valve body 54 may include a second brace member 164. The second brace member 164 may be joined to the first valve body surface 96 and extend away from the first valve body surface 96. The second brace member 164 may be positioned between the outer surface 72 and the inner passageway 74 of the valve body 54. The second brace member 164 may extend continuously or discontinuously about the inner passageway 74. An actuator or other dispensing component may be joined to a portion of the second brace member 164.

The second brace member 164 may function to aid in guiding the engagement member 68 and/or the resilient member 58 as the valve stem 62 moves between the sealed configuration, the dispensing configuration, and/or the filling configuration. The second brace member 164 may substantially surround the engagement member 68 and/or the resilient member 58 such that the engagement member 68 may slidably move and the resilient member 58 may move, such as by deflecting or compressing. A gap may be present between the second brace member 164 and the engagement member 68. The engagement member 68 may slidably engage a portion of the brace member 164. For example, the engagement member may comprise a protrusion that slidably engages a ridge within the interior portion of the second brace member to prevent the engagement member from rotating.

The valve body 54 may include one or more ribs. A rib 166 may extend between the first brace member 162 and the second brace member 164. The rib 166 may be joined to at least one of the first brace member 162 and the second brace member 164. As illustrated in FIG. 6A, the rib may be joined to both of a portion of the first brace member 162 and a portion of the second brace member 164. The rib may extend radially between the first brace member 162 and the second brace member 164. The rib 166 may be joined to the first valve body surface 96. The rib 166 may not be joined to the first valve body surface 96 and, thus, a gap may be present between the first valve body surface 96 and the rib 166. The one or more ribs 166 may aid in manufacturing the aerosol dispenser. For example, the one or more ribs 166 may be used to grip the valve body 54 such that the valve body 54 may be moved and/or attached to the container. The one or more ribs 166 may be operatively engaged by processing equipment during the manufacture of the aerosol dispenser. The one or more ribs 166 may allow for welding, such as by spinning, the valve body 54 to the container. The one or more ribs 166 may also provide structural stability to the valve body 54. The one or more ribs 166 may aid in controlling the deformation of the valve body 54 when the aerosol dispenser is subject to relatively high temperatures, for example.

As previously discussed, the valve body 54 may include a first hoop member 140. Each of the first brace member 162, the second brace member 164, and the rib 166 may extend from the first hoop member 140. Each of the first brace member 162, the second brace member 164, and the rib 166 may extend from of the first hoop upper surface 148. The first brace member 162 and the second brace member 164 may be joined to the first hoop upper surface 148. The rib 166 may be joined to the first hoop upper surface 148 or a gap may be formed between the first hoop upper surface 148 and the rib 166.

It is to be appreciated that the valve body 54 may include a single hoop member.

As illustrated in FIGS. 6A and 6B, the valve body 54 may include one or more protrusions that extend from at least one of the first valve body surface 96 and the second valve body surface 98. The valve body 54 may include a first attachment protrusion 168. The first attachment protrusion 168 may be joined to the second valve body surface 98 and extend away from the second valve body surface 98. The first attachment protrusion 168 may extend continuously or discontinuously about the inner passageway 74. The first attachment protrusion 168 may extend continuously or discontinuously about the longitudinal axis 70. The first attachment protrusion 168 may extend from the outer surface 72 of the valve body 54 towards the inner passageway 74. The first attachment protrusion 168 may be configured to be join the valve body to a portion of the neck of the container. The first attachment protrusion 168 may be welded to a portion of the neck of the container. It is to be appreciated that first attachment protrusion may be joined to the neck such as by a press fit, interference fit, crimping, solvent welding, laser welding, sonic welding, ultrasonic welding, spin welding, adhesive, or any combination thereof. The height and width of the first attachment protrusion 168 may be selected to obtain a desired weld between the valve body and the container. Generally, the greater the surface area, the greater the strength of the weld. The first attachment protrusion 168 may include one or more grooves or other surface profile such that gas may pass between a portion of the first attachment protrusion 168 and the neck prior to the valve body being sealed to the container.

As illustrated in FIGS. 6A and 6B, the valve body 54 may include a second attachment protrusion 170. The second attachment protrusion 170 may be joined to the second valve body surface 98 and extend away from the second valve body surface 98. The second attachment protrusion 170 may extend continuously or discontinuously about the inner passageway 74. The second attachment protrusion 170 may extend continuously or discontinuously about the longitudinal axis 70. The second attachment protrusion 170 may extend from the outer surface 72 of the valve body 54 towards the inner passageway 74. The second attachment protrusion 170 may be configured to join the valve assembly to a portion of the neck of the container or a portion of the product delivery device 56. The second attachment protrusion 170 may be welded to a portion of the neck of the container or a portion of the product delivery device 56, such as a bag, dip tube, or dip tube adaptor. It is to be appreciated that second attachment protrusion may be joined to the neck such as by a press fit, interference fit, crimping, solvent welding, laser welding, sonic welding, ultrasonic welding, spin welding, adhesive, or any combination thereof.

The valve body 54 may include a valve skirt 172. The valve skirt 172 may be joined to the second valve body surface 98 and extend away from the second valve body surface 98. The valve skirt 172 may extend continuously or discontinuously about the inner passageway 74. The valve skirt 172 may extend continuously or discontinuously about the longitudinal axis 70. The valve skirt 172 may be positioned between the outer surface 72 and the inner passageway 74 of the valve body 54 or the longitudinal axis 70. The valve skirt 172 may be positioned between the first attachment protrusion 168 and the inner passageway 74 of the valve body 54 or the longitudinal axis 70. The valve skirt 172 may be positioned between the second attachment protrusion 170 and the inner passageway 74 of the valve body 54 or the longitudinal axis 70. The valve skirt 172 may extend from at least one of the first hoop member 140 and the second hoop member 142. As illustrated in FIGS. 6A and 6B, the valve skirt 172 may extend from the second hoop lower surface 150 towards the bottom of the container. The valve skirt may be used to prevent material from interfering with the movement and operation of the valve assembly. It is to be appreciated that the valve skirt may or may not be present, and this may be dependent on the type and geometry of the product delivery device 56.

The valve body 54 may be made of any suitable material. The valve body may be fixedly joined to the container in order to contain the product and/or propellant. A valve body fixedly joined to the container may be made from a material including PET. The material from which the valve body is made may include at least about 90% by weight PET, at least about 92.5% by weight PET, or at least about 95% by weight PET. The valve body 54 may be fixedly joined to the container by welding a portion of the valve body 54 to the container 32.

In embodiments, the valve body may be joined to the container is such a way that the end-user is not capable of removing it. If the end-user (e.g. the consumer) were able to remove the valve-body, the entire product/propellant contents of the dispenser could be released.

In embodiments, the valve body 54 may be removably joined to the container is such a way that the end-user is capable of removing it safely, for example to refill the product contents of the container after they have been used up. Such a removable joining may include one or more of the following, for example, external threading, internal threading, bayonet fitting, a fitting requiring less than a full 360° rotation, such as click or snap fitting. Alternately, the valve body may be connected to the dispenser as a screw-in attachment, such as disclosed in U.S. Patent Publication No. US 2018-0044096, and, optionally, with an anti-rotation feature, such as disclosed in U.S. Patent Publication Nos. US 2019-0077558; US 2019-0077583; US 2019-0077584; and US 2019-0077582. In this configuration, the valve-body may be safely connected to the container in that the end-user cannot remove it, but then becomes separable from the container during the recycling process (e.g. after the grinding step).

Where the valve body is made from a material other than PET, it is preferred that the valve body not be fixedly joined to the container, and that the material-of-construction of the valve-body have a density of less than 1.0 g/cm$^3$ so that it can be separated from the PET during the recycling process.

A valve stem 62 may extend through the inner passageway 74 of the valve body 54. The valve stem 62 provides a product flow path from the interior of the container to the actuator 46 and operatively joins the actuator 46 to the valve assembly 52. The valve stem 62 may be positioned with respect to the valve body 54 in a sealed configuration such that an upper portion 86 of the valve stem 62 extends through the first passageway opening 76 of the valve body 54, a second portion 88 of the valve stem 62 may be substantially surrounded by the passageway surface 80, and a third portion 90 of the valve stem 62 may extend through the second passageway opening 78 of the valve body 54. The valve stem 62 may be moveable with respect to the valve body 54, for example between a sealed or sealing configuration and/or a dispensing configuration and/or a filling configuration. Thus, the valve stem 62 may be positioned in other configurations as the valve stem 62 moves. The valve stem 62 may include an outer stem surface 92 and an inner stem surface 94 opposite the outer stem surface. The inner stem surface 94 may define a channel 95 through which product and/or propellant may flow either out from or into the container. The valve stem 62 may include a dispensing opening 116 that may be used to introduce propellant and/or product into the container or dispense product and/or propellant from the container.

The valve assembly 52 may include an engagement member 68. The engagement member 68 may be joined to a portion of the valve stem 62 such that the engagement member 68 moves as the valve stem 62 moves. The engagement member 68 may extend from the outer stem surface 92 towards the outer surface 72 of the valve body 54. The engagement member 68 may be axisymmetric or non-axisymmetric. The engagement member 68 includes an engagement surface 69. The engagement surface 69 is configured to operatively engage a portion of the resilient member 58. The resilient member 58 may be positioned between the engagement surface 69 and a portion of the valve body 54. When the valve stem 62 is in a sealing configuration, the engagement surface 69 may operatively engage the resilient member 58 such that the resilient member 58 is placed under a desired amount of compression which biases the valve stem 62 to remain in a position such that a seal is maintained. When the valve stem 62 is in a dispensing configuration, a user or other mechanical device may overcome a compressive force of the resilient member to move the valve stem 62 from the sealing configuration to the dispensing configuration. As the valve stem 62 moves from the sealing configuration to the dispensing configuration, the engagement member 68 compresses the resilient member 58. It is also to be appreciated that the resilient member 58 may be further compressed to move the valve stem 62 from a dispensing configuration to a filling configuration, which will be disused in more detail herein. The engagement member 68 may have an engagement member density. The engagement member density may be less than or greater than 1.0 g/cm$^3$.

The valve stem 62 may include one or more orifices 108. The orifices 108 may be used for filling the container with product and/or propellant and dispensing product and/or propellant from the container. The one or more orifices 108 may be any shape or size so long as product and/or propellant may be at least one of filled and dispensed through such orifice. For example, the one or more orifices may be circular, oval, rectangular, square, or any other shape. The one or more orifices 108 may be tapered. For a valve stem 62 including two or more orifices, each of the orifices may be the same or different shapes and may be the same or different sizes. For example, when both a dispensing orifice and a filling orifice are included in the valve stem 62, the filling orifice may have a larger cross-sectional open area than the dispensing orifice. The orifice 108 may extend from the outer stem surface 92 to the inner stem surface 94. The orifice 108 may be in fluid communication with the channel 95 defined by the inner stem surface 94 such that product and/or propellant may flow through the orifice and into the channel 95. The product and/or propellant may flow from the container, through the orifice, and into the channel 95. The product and/or propellant may also flow through the channel, through the orifice, and into the container.

The one or more orifices 108 may be positioned about the valve stem 62 such that the release of product and/or propellant is controlled. The orifice 108 may be positioned between the first portion 86 of the valve stem 62 and at least a portion of the valve seal 82. Stated another way, the one or more orifices 108 may be positioned such that at least a portion of the valve seal 82 is located between the orifice and the third portion 90 of the valve stem 62 to prevent product and/or propellant from freely flowing from the container and through the orifice. The portion of the valve seal 82 positioned between the orifice and the third portion prevents product and/or propellant from flowing to the orifice prior to the valve stem being moved to a dispensing configuration. When the valve stem is in a sealing configuration, the valve seal 82 prevents product and/or propellant from accessing the orifice and contains the product and/or propellant within the container. A second portion of the valve seal 82 may be located between the orifice and the first portion 86 of the valve stem to prevent product and/or propellant from freely flowing through the inner passageway 74 and out the first passageway opening 76 as product and/or propellant flow through the orifice.

The valve stem 62 may include a third portion 90, opposite the first portion 86. The third portion 90 of the valve stem 62 may include a retaining member 110. The retaining member 110 may be joined to the third portion 90 of the valve stem 62 or the retaining member 110 may be formed with the remainder of the valve stem 62. The retaining member 110 may be formed from the same material as the other portions of the valve stem 62 or with a different material. For example, the retaining member 110 may be formed, at least in part, with a first material and the remainder of the valve stem 62 may be formed with one or more other materials that are different from the first material. The first material may have a melting point or a glass transition temperature (tg) that is lower than the one or more other materials of the valve stem to allow at least the portion of the retaining member including the first material to melt, soften, deflect, or deform at a given temperature that is relatively lower than the remainder of the valve stem 62.

At least a portion of the retaining member 110 may extend outward, such as radially outward, beyond the outer stem surface 92 and may be configured to engage a portion of the valve body 54 and/or the valve seal 82. The retaining member may be axisymmetric or non-axisymmetric. The retaining member 110 may work in cooperation with the resilient member 58 to position the valve stem 62 in a sealed position. The retaining member 110 may be any shape such that a portion of the retaining member 110 may operatively engage at least one of a portion of the valve body 54 and the valve seal 82. The shape of the retaining member 110 may be such that the retaining member 110 maintains the position of the valve stem 62 during safe operating conditions and aids in safely moving the valve stem to vent the container during adverse operating conditions, such as relatively elevated temperatures and over pressurization of the aerosol dispenser.

As previously discussed, the valve stem 62 extends through the inner passageway 74 of the valve body 54. The valve stem 62 is positioned within the valve body 54 such that a portion of the valve stem 62 extends along the passageway surface 80 and through at least one of the first passageway opening 76 and the second passageway opening 78. The valve stem 62 includes an outer stem surface 92 and an inner stem surface 94. The inner stem surface 94 defines a channel 95 in fluid communication with a dispensing opening 116 through which product and/or propellant may be introduced into or dispensed from the container. The outer stem surface 92 may be configured to operatively engage at least one of the engagement member 68 and the resilient member 58 such that the resilient member 58 controls the movement of the valve stem 62. The engagement member 68 may include one or more protrusions to operatively engage a portion of the valve stem 62. The outer stem surface 92 may include one or more protrusions and/or notches to operatively engage the engagement member 68. The engagement member 68 may substantially surround the valve stem 62 and operatively engage the valve stem 62 such that moves with the valve stem 62.

As illustrated in FIGS. 6B and 7B, the valve stem 62 may include a first stem portion 86, a second stem portion 88, and a third stem portion 90. The second stem portion 88 may be intermediate the first stem portion 86 and the third stem portion 90. The first stem portion 86 may be opposite the third stem portion 90. The retaining member 110 may be joined to a portion of the third stem portion 90. The retaining member 110 may extend outward from the outer stem surface 92. The retaining member 110 may be manufactured with the valve stem 62 such that it is a unitary member or the retaining member 110 may be attached to the valve stem 62. The valve stem 62 may be entirely constructed as a single piece or may be constructed from multiple parts; the multiple parts may or may not correspond to the first, second and third portions of the valve stem as delineated herein. The retaining member 110 extends outwardly from the longitudinal axis 70 to a distance that allows the retaining member 110 to form a seal with the valve seal 82. The retaining member 110 engages a portion of the valve seal 82 when the valve stem 62 is in a sealed configuration to prevent propellant and/or product from being released through the valve stem 62. The retaining member 110 may be any shape that allows the retaining member to form a seal with a portion of the valve seal. For example, the retaining member 110 may be substantially circular, rectangular, square, or an irregular shape. The retaining member 110 may be axisymmetric or non-axisymmetric.

The valve stem may be separably joined to the valve body. The valve stem must be move-able at least between a closed configuration and a dispensing configuration, and preferably also to a filling configuration. The valve stem may be made from a material comprising PET. The material may include at least about 90% by weight PET, at least about 92.5% by weight PET, or at least about 95% by weight PET. The valve stem may be made from a material other than PET, and that material may have a density of less than 1.0 g/cm³.

The valve assembly 52 may include a valve seal 82, such as illustrated in FIGS. 4A and 4B. The valve seal may be disposed on at least a portion of the passageway surface 80 and may extend about a portion of the passageway surface 80. The valve seal may be joined to the passageway surface 80 such that the valve seal remains in position as the valve stem 62 moves from the sealed configuration to a dispensing configuration or a filling configuration. The valve seal may extend from the passageway surface 80 toward the second passageway opening 78. The valve seal 82 may extend about the second passageway opening 78. The valve seal 82 may extend from the passageway surface 80 to the first passageway opening 76. The valve seal 82 may extend about the second passageway opening 78 without extending from the passageway surface 80. The valve seal 82 may be any shape such that a seal is formed with a portion of the valve stem 62 and product and/or propellant is contained within the container.

As previously discussed, the valve assembly 52 may include a valve seal 82. The valve seal 82 may be molded into position or manufactured separately and later joined to the valve body. For example, the valve seal may be molded in the second step of a two-step molding process, which also may be known as over-molding. The valve seal 82 may be joined the valve body, which includes removably joined and fixedly joined. For a valve seal 82 that has been removably joined to the valve body, the valve seal 82 is disposed on the valve body and may be removed from the valve body. For example, the valve seal 82 may be removably joined to the valve body such that when the aerosol dispenser is processed for recycling, the valve seal 82 separates from the passageway surface 80. For a valve seal 82 that has been fixedly joined, the valve seal 82 is attached to at least a portion of the valve body such that mechanical and/or chemical means are needed to separate the valve seal and the valve body. The valve seal 82 that is fixedly attached may be attached through the adhesive-like properties of the material of the valve seal 82 or a separate adhesive may be used. For example, a valve seal 82 that is fixedly joined may remain attached, or at least a portion remains attached, to the valve body when the aerosol dispenser is processed for recycling. The valve seal 82 may be made from any material that provides a seal between the valve seal 82 and the valve stem 62. The valve seal 82 may be made from one or more materials including thermoplastic elastomers (TPE), silicone, rubber, or polymers, any of which may be foamed. The valve seal 82 may include a cross-linked material or a non-cross-linked material. The valve seal 82 may have a valve seal density. The valve seal density may be less than or greater than 1.0 g/cm³.

The valve seal 82 may include a first seal surface 102 and a second seal surface 104, which is opposite the first seal surface 102. The first seal surface 102 abuts at least one of a portion of the passageway surface 80 and the second passageway opening 78. The first seal surface 102 may be joined to at least one of a portion of the passageway surface 80 and the second passageway opening 78. At least a portion of the second seal surface may be in facing relationship with the valve stem 62 and a portion of the second seal surface 104 operatively engages a portion of the valve stem 62 to form a seal therewith. The valve stem 62 extends through the inner passageway 80 and includes an outer stem surface 92 and an inner stem surface 94. A portion of the second seal surface 104 operatively engages a portion of the outer stem surface 94. The valve stem 62 includes one or more orifices 108 that extend from the outer stem surface 94 to the inner stem surface 94 and are in fluid communication with the channel 95. The one or more orifices allow product and/or propellant to be dispensed from, or filled into, the container. These orifices 108 need to remain sealed when the valve stem 62 is in a sealed configuration. The valve seal 82 operatively engages the valve stem 62 to form a seal that prevents propellant and/or product from accessing the orifice when the valve stem 62 is in a sealed configuration. The valve seal 82 is configured to remain in a stationary position as the valve stem is moved from the sealed configuration to the dispensing configuration and from the dispensing configuration to a filling configuration. The movement of the valve stem with respect to the valve seal allows controlled dispensing and/or filling of product and/or propellant through the one or more orifices of the valve stem.

As illustrated in FIG. 5A, the valve seal 82 may be positioned between the valve body 54 and the valve stem 62. The valve seal 82 includes a first seal surface 102 that abuts a portion of the valve body 54 and a second seal surface 104 in facing relationship with at least a portion of the valve stem 62. The valve seal 82 extends from the first passageway opening 76 about the second passageway opening 78 and into the valve body cavity 100. More specifically, the first valve seal end portion 105 is disposed adjacent to the first passageway opening 76 and the second valve seal end portion 106 is substantially surrounded by the valve body cavity 100. The second seal surface 104 of the valve seal 82 operatively engages the outer surface of the valve stem such that the one or more orifices are sealed from the product and/or propellant when the valve stem is in a sealed configuration. The valve seal 82 may have a constant thickness from the valve seal first end portion 105 to the valve seal second end portion 106 or a varying thickness from the first valve seal end portion 105 to the second valve seal end portion 106.

As illustrated in FIG. 5B, the valve seal 82 may be positioned between the valve body 54 and the valve stem 62. The first seal surface 102 abuts a portion of the valve body 54 and the second seal surface 104 is in facing relationship with at least a portion of the valve stem 62. The valve seal 82 has a variable thickness. However, it is to be appreciated that the valve seal 82 may have a constant thickness. The valve seal 82 extends about the first passageway opening 76 such that a portion of the valve seal first end portion 105 extends above the first passageway opening 76 and the valve seal second end portion 106 extends about the second passageway opening 78 and at least a portion is disposed in the valve body cavity 100. The portion of the valve seal first end portion 105 that extends about the first passageway opening 76 may aid in maintaining the position of the valve seal 82 to the valve body 54. The portion of the valve seal first end portion 105 that extends above the first passageway opening 76 may be configured to operatively engage a portion of the resilient member 58.

The valve seal may operatively engage at least one of the valve body and the valve seal to form a seal when the valve stem is in the closed configuration. The seal prevents product and/or propellant from being released from the container. The valve seal may be made from a flexible material to aid in forming the seal. The valve seal may comprise a thermoplastic elastomer (TPE) or a rubber or any appropriate flexible material.

The valve seal may be separably joined to either of the valve stem or the valve body. Alternately, the valve seal may be separably joined to both the valve stem and the valve body, and held in place by, for example, a friction-fit or snap-fit.

The valve seal may be fixedly joined to at least one of the valve stem or the valve body. Where the valve seal is fixedly joined to either of the valve stem or the valve body, the respective valve stem or valve body is preferably separably joined to the container so as to be separable in the recycling process. The valve seal is preferably made from a material-of-construction that has a density of less than about 1.0 g/cm$^3$.

The valve assembly 52 may include a resilient member 58. The resilient member 58 may be disposed on a portion of the valve body 54. The resilient member 58 may be positioned adjacent to the first passageway opening 76 and substantially surround the longitudinal axis 70. The resilient member 58 may be any compliant member that provides resistance to a force providing movement of the valve stem 62 when the valve stem 62 is moved in a direction toward the container 32, such as to a dispensing configuration or a filling configuration, and returns the valve stem 62 to a sealing configuration, also referred to herein as a sealed configuration, when the force is removed or lessened. The resilient member 58 may be made from a polymer. The resilient member 58 may have a resilient member density. The resilient member density may be less than or greater than 1.0 g/cm$^3$. The resilient member 58 may be any shape such that the resilient member 58 operatively engages the valve stem and controls the movement of the valve stem.

The resilient member 58 may be disposed on at least a portion of the first valve body surface 96, such as illustrated in FIGS. 5A, 5B, 6A, and 7A. The resilient member 58 may include a first resilient member surface 190 and a second resilient member surface 192. The resilient member 58 may be positioned between the engagement member 68 and the first valve body surface 96. The second engagement member surface 188 may operatively engage at least a portion of the first resilient member surface 190 and the second resilient member surface 192 may be disposed on at least a portion of the first valve body surface 96. The second engagement member surface 188 may extend over the first resilient member surface 190 such that the engagement member 68 compresses the resilient member 58 as the valve stem 62 moves between the sealed, dispensing, and/or filling configuration.

The resilient member 58 may be made from a resilient polymeric material such as a thermoset material, a thermoplastic material, or a plastomer. The resilient polymeric material may include a non-cross-linked material. The resilient polymeric material may include a melt-processible material. The thermoplastic material may contain cross-liked polymer chains but must remain melt processible. The resilient member may be made entirely from one or more non-cross-linked resilient polymeric materials. The resilient member may be made entirely from one or more melt-processible resilient polymeric materials. The resilient polymeric material may be modified such as by means of additives or by foaming to alter its properties.

The resilient member may comprise one or more thermoplastic elastomers (TPE). The thermoplastic elastomer may be a styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof.

To aid with recyclability of the container, the resilient member may include at least one of a non-cross-linked material and a melt-processible material or the resilient member may be made entirely from one or more non-cross-linked, melt-processible materials. Further, the resilient member 58 may have a density that would allow the resilient member 58 to be float-separable during the recycling process. The resilient member 58 may have a density less than 1.0 g/cm$^3$. The resilient member 58 may be separably joined to those components having a density greater than 1.0 g/cm$^3$ and/or those components made from material including PET. The resilient member 58 may be fixedly joined or separably joined to other components having a density less than 1.0 g/cm$^3$ or less than the density of the fluid used during the recycling process. For example, the resilient member 58 may be fixedly joined to the engagement member, which also has a density less than 1.0 g/cm$^3$.

It is to be appreciated that the resilient member may comprise PET.

The aforementioned components of the aerosol dispenser 30 may be polymeric. By polymeric it is meant that the component is formed of a material that includes polymers, and/or particularly polyolefins, polyesters, or nylons, EVOH, or mixtures thereof. Thus, the entire polymeric aerosol dispenser 30 or, specific components thereof, is free of metal. The container 32, and all other components, may comprise, consist essentially of, or consist of PET, PEF, PEN, Nylon, EVOH, PE, PP, TPE, or combinations thereof. All or substantially all of the components of the polymeric aerosol dispenser, excluding the propellant and product, may be configured to be accepted in a single recycling stream. All such materials, or a majority of the components of the aerosol dispenser 30 (excluding the propellant and product) may be comprised of a single class of resin according to ASTM D7611. Particularly, the majority of the aerosol dispenser 30 by weight may be PET. The majority of the valve assembly by weight may be PET. The majority of the product delivery device by weight may be PET.

As previously discussed, recycling of polymeric aerosol dispensers has traditionally been relatively complicated. Aerosol dispensers require the use of various different types of components that are made from a number of different materials to, for example, adequately maintain pressure, selectively dispense product until the dispenser is empty, and safely depressurize when subject to relatively high temperatures and pressures. Further, the joining of those components to one another is also an important consideration to having an effective aerosol dispenser. However, the more diverse the types of materials, and the more those diverse types of materials that are fixedly joined to one another, the relatively more difficult the recycling of the aerosol container becomes.

Figure 8:
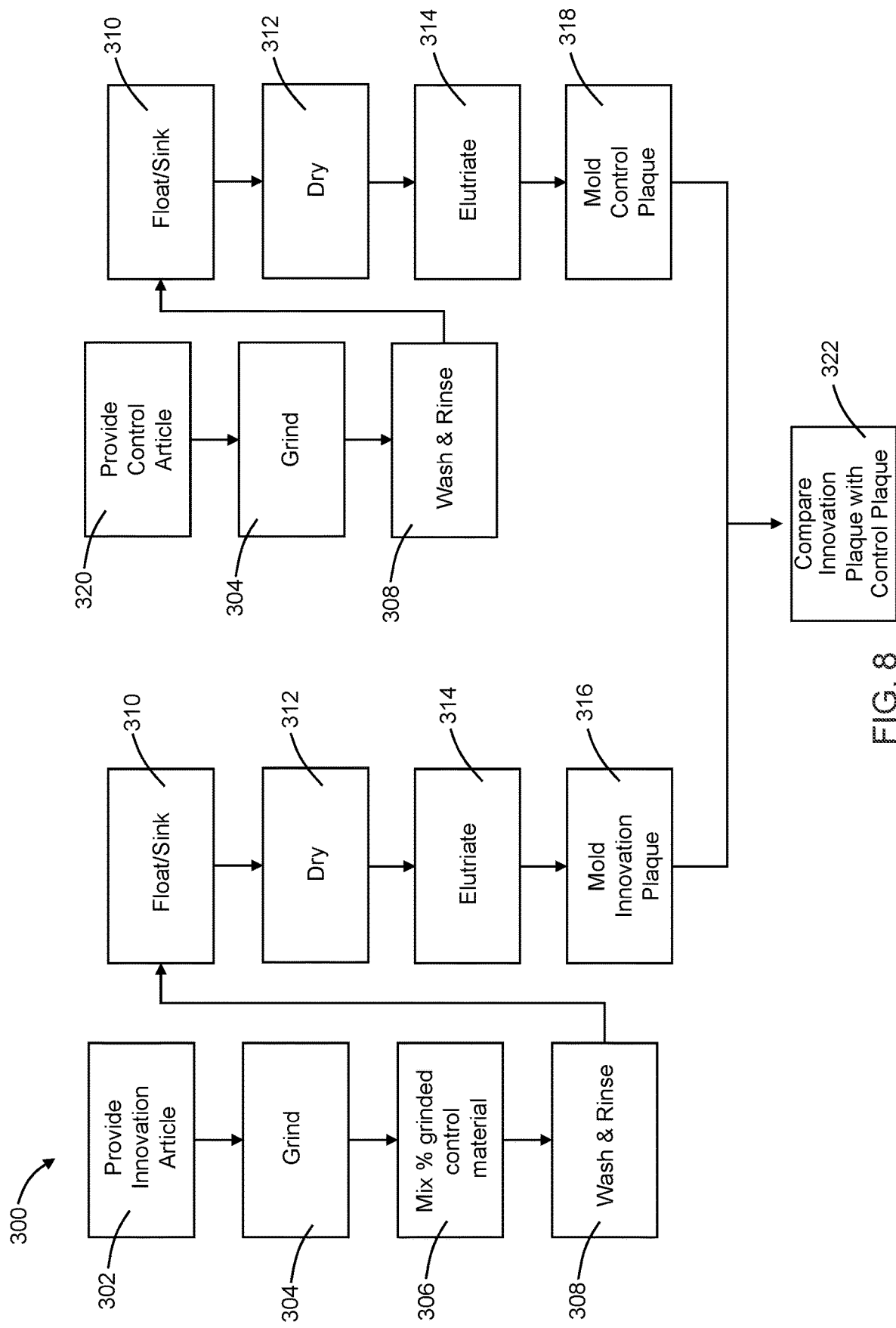
FIG. 8 is a flow diagram of the benchmark process.
Figure 9:
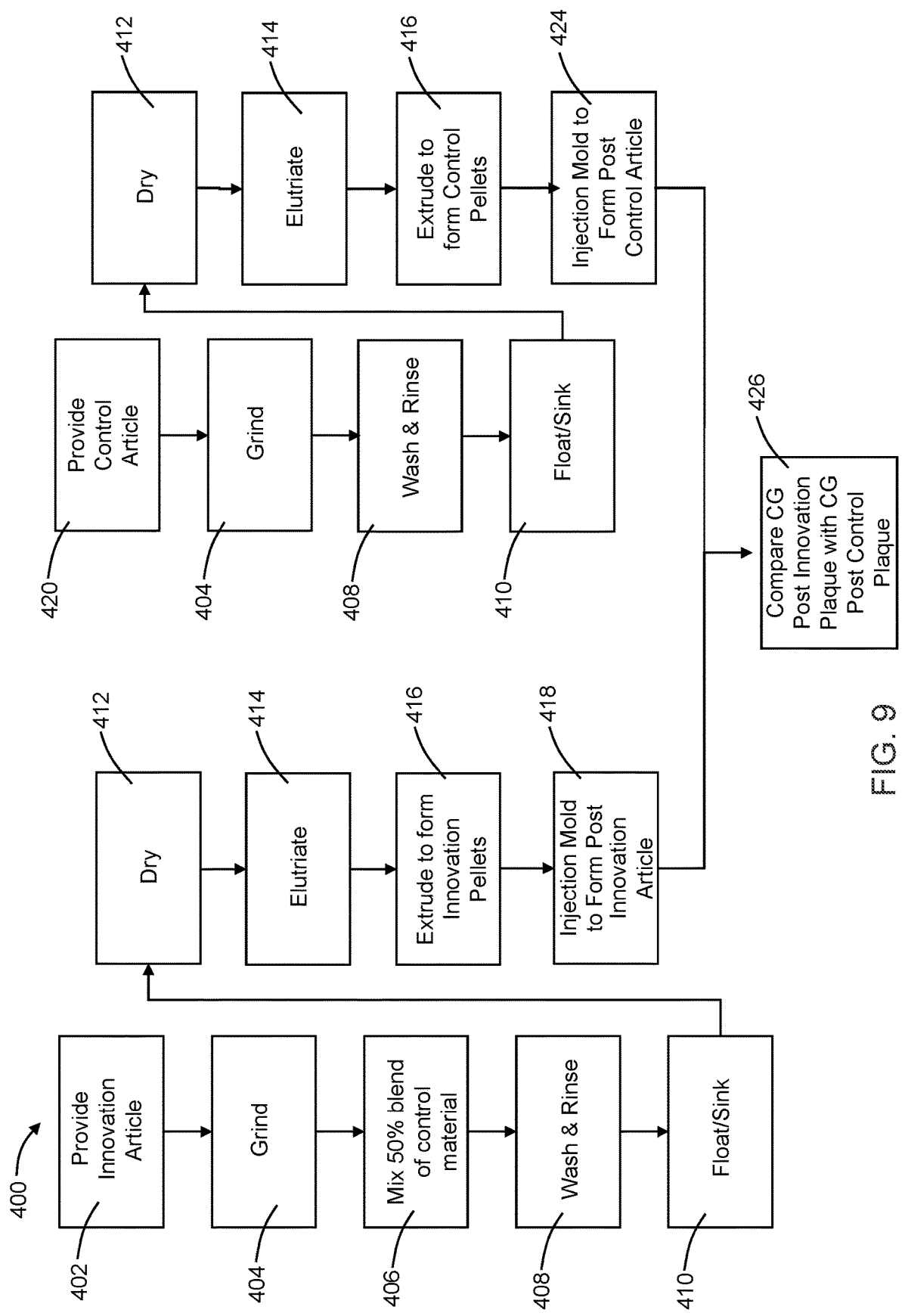
FIG. 9 is a flow diagram of the critical guidance process.

With regard to recycle-ability it is desirable that those components which are not acceptable to the dispenser's primary material recycling stream, be separable by the recycling process. The recycling process, as illustrated in FIGS. 8 and 9, generally includes the steps of grinding, rinsing, and floating, during which any materials which are not acceptable to the recycling steam might be removed. For example, non-acceptable components might be friction-fit to the dispenser so that they are separated from the bulk of the container during the grinding step. Further, where the primary material's recycling stream is a PET recycling stream (e.g. Class 1) these materials might have a density of less than 1.0 so that they are separated from the PET, which has a density of greater than 1.0, such as during the flotation step. PET has a density of about 1.38 g/cm$^3$. The density of PET may be greater than the density of the fluid used in the recycling process such that the PET will sink during the recycling process.

To aid in the recyclability of the aerosol dispenser, the construction of the aerosol dispenser includes various joining means, depending on the nature of the material(s) being joined. For example, the primary recycling steam for polymeric aerosol dispenser is the PET recycling stream. Containers for aerosol products are typically made from PET due to the stresses imposed on the material by the pressures contained therein. Those components of the aerosol dispenser that also are made from PET may be fixedly joined to the container, either directly or indirectly, while those which are not made from PET may be separably joined. Those components that are not fixedly joined to the container could be fixedly joined to each other so long as the component separate from the component made from PET. The components that are not made from PET are, generally, made from materials having a density less than 1.0 g/cm$^3$ so that they will float and separate from the components made from PET.

For example, the components may be fixedly joined by welding such components together. The weld may retain propellant and/or product therein. Suitable welding processes may include sonic, ultrasonic, spin, and laser welding. For example, spin welding provides the benefit that the energy plane is generally confined to a small vertical space, limiting unintended damage of other components not intended to be welded or receive such energy. Welding may be accomplished with a commercially available welder, such as available from Branson Ultrasonics Corp. of Danbury, Conn.

Further, as previously discussed, the recycling industry has set guidelines for the recyclability of polymeric containers, including polymeric aerosol dispensers. For example, the Association of Plastic Recyclers (APR) is a national trade association that represents companies who acquire, reprocess, and sell the output of the post-consumer plastic processing capacity in North America, and APR promotes developing protocols for the design of packaging for greater recyclability. The APR has set forth guidelines to obtain their recognition for containers, including aerosol containers. Further, there are other initiatives that focus on specific materials and how they are affected in the recycling stream. For example, the European PET Bottle Platform (EPBP) is a voluntary industry initiative that provides PET bottle design guidelines for recycling, evaluates PET bottle packaging solutions and technologies, and facilitates understanding of the effects of new PET bottle innovations on the recycling process. To produce a recyclable and sustainable aerosol dispenser it is important that the aerosol dispenser components and assembly of those components makes it such that the aerosol dispenser complies with the recyclability industry guidelines.

The following discussion will detail one or more aerosol dispensers that meet or exceed the recyclability standard as set forth by the APR and EPBP.

The APR set forth two processes that may be followed to evaluate the recyclability of the article, a benchmark process 300 and a critical guidance process 400. These processes may be used to evaluate an innovation articles impact on the PET recycling stream. The benchmark process may be used to aid in determining recyclability of a container prior to using the critical guidance process. Generally, the benchmark process involves fewer steps to obtain information that may be used to evaluate the recyclability of an article, such as an aerosol dispenser. The critical guidance process 400 is a relatively more involved process that requires more steps to obtain data that may be used to evaluate the recyclability of an article. The critical guidance process 400 is used by the APR to determine whether to recognize an article.

As illustrated in FIG. 8, the APR benchmark process 300 includes providing a control article 320. The control article contains the material that is to be compared against the innovation article. For example, in the evaluation of the recyclability of a polymeric aerosol dispenser, the control article may be only the container of the aerosol dispenser. More specifically, the control article may include the container that is made of at least about 90% by weight of a material, such as PET. The process 300 also includes providing the innovation article 302 to be compared against the control article. The innovation article may be an assembled aerosol container, including, for example, a container, a valve assembly, a product delivery device, and an actuator. The aerosol container may not include product and/or propellant. The control article is compared with the innovation article after each article is subject to the following benchmark processes 300 steps. Generally, the same steps are performed on each of the innovation article and the control article. However, each of the innovation article and the control article are processed separately. Each of the innovation article and the control article are subject to a grinding process 304. During the grinding process, the article interacts with one or more blades to cut the article into two or more pieces to form a ground innovation article and a ground control article.

To mimic the penetration of recycled material with virgin material as would be present if the article was used in commerce and then recycled after use, the ground innovation article is combined with a certain amount of ground control article, referred to herein as the mixed, ground innovation article. The ground innovation article is mixed with a certain percentage blend of the control article 306. It is to be understood that the ground control article added to the ground innovation article is not taken from the ground control article to be evaluated against the innovation article, but rather, is separate, additional ground control articles. The blend may be such that the ground innovation article makes up at least 50% by weight, at least 25% by weight, at least 10% by weight, at least 5% by weight, or at least 1% by weight of the total combined weight of ground innovation article and ground control article. Stated another way, one or more innovation articles may be provided for undergoing the benchmark process 300. The amount of ground innovation article may be such that it makes up at least 50% by weight, at least 25% by weight, at least 10% by weight, at least 5% by weight, or at least 1% by weight of the total combined ground innovation article and ground control article. The benchmark process specifies that the total weight of the ground innovation article mixed with the ground control article is 10 lbs.

As illustrated in FIG. 8, the process that the control article undergoes does not include a mixing step. The control article is not combined with the innovation article because the control article is used as a standard for evaluation of the innovation article, as will be described herein.

The remainder of the process steps are applied to each of the ground control article and the ground innovation article that was combine with a certain amount of ground control article, the mixed, ground innovation article. Thus, the process steps will be described as referring to an article rather than specifying the control article and the mixed, ground innovation article.

The ground article may then proceed to a washing and rinsing process 308. Generally, the ground article is placed into a caustic liquid that is agitated. It is during this process that separable components may separate from one another and water soluble materials may begin to, continue to, or completely dissolve. After the ground article has been subject to the caustic wash for a certain period of time, the ground article is rinsed. During the rinsing process, additional pieces of the ground article may separate from one another. The rinsed, ground article may then be placed in a float/sink process 310. The float/sink process may be such that when the rinsed, ground article is placed in the float/sink basin, those pieces of the ground article that have a density less than 1.0 g/cm$^3$ float to the top portion of the basin. A current may be applied to the top portion of the basin such that those pieces that float are carried in the current to a desired location. Those pieces that have a density greater than 1.0 g/cm$^3$ sink to the bottom portion of the basin. The pieces that sink to the bottom of the basin are collected. The collected pieces are then dried 312. The drying process 312 may include allowing the collected pieces to air dry for a period of time.

The dried, collected pieces are then subject to an elutriation process 314. The elutriation process 314 further separates the dried, collected pieces. Air or other fluid may be used to blow the dried, collected pieces. The relatively lighter pieces will blow away in the air stream and the relatively heavier pieces will not blow away. Thus, the elutriation process separates the pieces based on weight. The relatively heavier pieces are collected and molded into a plaque 316, an innovation plaque. A plaque of the mixed innovation pieces may be formed, innovation plaque, and a plaque of the control pieces may be formed, control plaque. The plaques may be formed with an injection molding process.

The plague generated by the control article, control plaque, may then be compared 322 with the plaque generated by the mixed, innovation article, innovation plaque. The evaluation of the two plaques includes determining the L, $\Delta a^*$, $\Delta b^*$, and percentage of $\Delta$ haze. The APR guidance provides that the L value of the innovation plaque should be greater than 82. The APR guidance provides that the $\Delta a^*$ between the innovation plaque and the control plaque should be less than 1.5. The APR guidance provides that the $\Delta b^*$ between the innovation plaque and the control plaque should be less than 1.5. The APR guidance provides that the $\Delta$ haze percentage between the innovation plaque generated by the innovation article and the control plaque should be less than 10%.

The APR also sets forth a critical guidance process 400, as illustrated in FIG. 9. The process steps for the critical guidance process 400 are similar to those of the benchmark process 300. However, there are some differences. The difference in the critical guidance process 400 and the benchmark process 300 is in the processing after the elutriation step 416 and the total weight of the mixed ground innovation article and ground control article is 40 lbs. Similar to the above described process, the innovation article and the control article undergo separate processing such that a comparison of the two articles may be done upon completion of the process. The critical guidance process 400 includes providing an innovation article 402 and providing a control article 420. Each of the control article and the innovation article then undergo a grinding process 404. The ground innovation article is then mixed 406 with a certain amount of ground, control article. The ground innovation article should make up at least 50% by weight of the total of the ground innovation article mixed with the ground control article. The mixed, ground innovation article and the ground control article are then washed and rinsed 408, subject to a float/sink 410 step, dried 412, and then elutriated 414. The relatively heavy pieces that remain after the elutriation process 414 are collected and extruded 416 to from pellets. Each of the innovation article and the control article undergo this step. The extruded, mixed innovation article forms innovation pellets and the extruded control article forms control pellets. The innovation pellets are then injection molded 418 to form a CG post innovation plaque and the control pellets are then injection molded 424 to form a CG post control plaque. The CG post innovation plaque is then compared 426 to the CG post control plaque.

The comparison of the CG post innovation plaque and the CG post control plaque includes determining the L, $\Delta a^*$, $\Delta b^*$, and percentage of $\Delta$ haze. As previously discussed, the APR guidance provides that the L value of the plaque generated by the innovation article should be greater than 82. The APR guidance provides that the $\Delta a^*$ between the plaque generated by the mixed, innovation article and the plaque generated by the control article should be less than 1.5. The APR guidance provides that the $\Delta b^*$ between the plaque generated by the innovation article and the plaque generated by the control article should be less than 1.5. The APR guidance provides that the $\Delta$ haze percentage between the plaque generated by the innovation article and the plaque generated by the control article should be less than 10%.

The process set forth by the EPBP is similar to that set forth by the APR, so the EPBP process will not be described in detail herein. The difference between these two processes is generally the amount of the ground innovation article that is mixed with the ground control article. It is estimated that the EPBP will require that the total of the ground innovation article make up at least 5% and, in some cases from 5% to 10% by weight of the total ground innovation article mixed with the ground control article. The estimation of the percentage of ground innovation article to the percentage of ground control article is based on projected market penetration of the innovation article. To receive recognition by the APR, the ground innovation article makes up at least 50% by weight of the total ground innovation article mixed with the ground control article.

The aforementioned benchmark process 300 and critical guidance process 400 may be used to evaluate the recyclability steam of specific materials, such as PET. For example, the majority of the polymeric articles used for foods, beverages, and consumer products are made largely from PET. Thus, to allow the recycled PET material to be re-used to once again make articles for foods, beverages, and consumer products, the effect of other materials on the recycled PET needs to be minimized. The aforementioned processes may be used to evaluate the recycled PET material and increase the likelihood that the recycled PET material may be used to again make the articles.

The majority of the aerosol dispenser is made from PET. Thus, to effectively recycle the aerosol dispenser, those components that are made of materials other than PET or components that are made from materials including less than about 1% by weight PET or less than about 0.5% by weight PET or less than about 0.2% by weight PET should be separable from the PET material such that these components do not form part of the recycled PET or minimized such that those component or pieces thereof that form part of the recycled PET still allow for the recycled PET to once again be used for the manufacture of PET articles.

The aerosol dispenser may be designed to minimize those components that are different materials, to consider the density of the components so that certain components float and certain components sink, and to join components such that some are designed to be fixedly attached and some are designed to be removably attached. The following is a discussion of various types of aerosol dispensers and their configuration as it relates to recyclability.

As previously discussed, the aerosol dispenser may include a container 32, a valve assembly 52 joined to the container, a product delivery device 56 joined to at least one of the container and the valve assembly, and an optional actuator 46. The valve assembly may include a valve body 54, valve seal 82, a resilient member 58, a valve stem 62, and an engagement member 68. The types of materials used for these components and how these components are joined changes the recyclability of the aerosol dispenser.

Generally, it has been found that for those components that are made from the same materials, such as a polymeric material (i.e.—PET), may be fixedly joined to one another. Further, for those components that are made from different materials, such as a polymeric material (i.e.—PET) and an elastomer (i.e.—a thermoplastic elastomer), may be removably joined, such that the components separate during the recycling process. Further still, to recycle a certain type of material, such as PET, the components that are made from or substantially made from PET may be separable from those components that are not made from PET and adversely affect the integrity of PET such that the PET may not be re-used to make another PET article. Those components that separate should be separable from the material that is to be recycled. Finally, those materials that are different and not separable should have minimum effect on the material that is to be recycled.

In some embodiments, an aerosol dispenser including the following components: a container 32 that is made from a material including at least about 90% by weight PET; a valve body 54 that is made from material including at least about 90% by weight PET and the valve body 54 being fixedly joined to the container 32; a valve seal 82 that is made from a cross-linked, thermoplastic elastomeric material and fixedly joined to the valve body 54; a valve stem 62 that is made from a material including at least about 90% by weight PET and being moveably disposed within the inner passageway 74 of the valve body 54; a product delivery device 56 fixedly joined to at least one of the valve body 54 and the container 32; and an actuator 46 that is made from a material including polypropylene and removably joined to at least one of the valve body 54 and the container 32. The aforementioned aerosol dispenser was subject to the benchmark process 300. The results of the innovation plaque as compared to the control plaque showed at that this aerosol dispenser may have met the criteria for L, Δa*, Δb*, and percentage of Δ haze at a mix of less than about 5% by weight ground innovation article, but would have failed the criteria for L, Δa*, Δb*, and percentage of Δ haze at a mix of greater than about 5% by weight ground innovation article. It is believed that the failure of the valve seal to be separable from the valve body and the material of the valve seal being cross-linked, rubber resulted in the elastomeric material appearing as specks in the innovation plaque and adversely interfered with the process to manufacture the innovation plaque.

In some embodiments, an aerosol dispenser including the following components: a container 32 that is made from a material including at least about 90% by weight PET; a valve body 54 that is made from material including at least about 90% by weight PET and the valve body 54 being fixedly joined to the container 32; a valve seal 82 that is made from a non-cross linked, thermoplastic elastomeric and is fixedly joined to the valve body 54; a valve stem 62 that is made from a material including at least about 90% by weight PET and being moveably disposed within the inner passageway 74 of the valve body 54; a product delivery device 56 that is fixedly joined to at least one of the valve body 54 and the container 32; and an actuator 46 that is made from a material including polypropylene and removably joined to at least one of the valve body 54 and the container 32. The aforementioned aerosol dispenser was subject to the benchmark process 300. The results of the innovation plaque as compared to the control plaque showed that this aerosol dispenser may have met the criteria for L, Δa*, Δb*, and percentage of Δ haze at a mix of greater than about 5% by weight ground innovation article or greater than about 10% by weight ground innovation article. It is believed that the valve seal being a non-cross linked elastomer contributed to the recyclability of the aerosol dispenser.

In some embodiments, an aerosol dispenser including the following components: a container 32 that is made from a material including at least about 90% by weight PET; a valve body 54 that is made from material including at least about 90% by weight PET and the valve body 54 being fixedly joined to the container 32; a valve seal 82 that is made from a thermoplastic elastomeric material having a density less than 1.0 g/cm$^3$ and that is removably joined to the valve body 54; a valve stem 62 that is made from a material including at least about 90% by weight PET and being moveably disposed within the inner passageway 74 of the valve body 54; a product delivery device 56 that is fixedly joined to at least one of the valve body 54 and the container 32; and an actuator 46 that is made from a material including polypropylene and removably joined to at least one of the valve body 54 and the container 32. The aforementioned aerosol dispenser was subject to the benchmark process 300. The results of the innovation plaque as compared to the control plaque showed at that this aerosol dispenser may have met the criteria for 1, Δa*, Δb*, and percentage of Δ haze at a mix of greater than about 5% by weight ground innovation article, greater than about 10% by weight ground innovation article, greater than about 25% by weight ground innovation article, and greater than about 50% by weight ground innovation article. It is believed that the valve seal being separable from the valve body contributed to the recyclability of the aerosol dispenser.

In the aforementioned embodiments, the aerosol dispenser may include a base cup 48. A base cup 48 may be joined to a portion of the container 32. The base cup 48 may be mechanically joined, such as by threads or clamps, or chemically joined, such as by adhesives. To minimize the adverse impact of the base cup to recyclability, the base cup 48 may be fixedly joined to the container 32 and made from the same material as the container. The base cup may also be removably joined to the container 32 such that the base cup separates from the container and floats during the recycling process as described herein. To float, the base cup has a density less than the fluid used in the recycling process. For example, the base cup may have a density less than 1.0 g/cm$^3$. The base cup may also be joined to the container with an adhesive. The type of adhesive may be selected to minimize the adverse impact on the recycling process. The adhesive may be a water-soluble adhesive, such that the adhesive dissolves in one or more fluids used in the recycling process as described herein. The adhesive may be tackifier-free. The adhesive may by such that when the base cup separates from the container, all or substantially all of the adhesive remains adhered to the base cup. Thus, if the base cup floats, the adhesive will float with the base cup during the recycling process. The adhesive may also be produced such that the adhesive separates from the base cup and/or the container and floats during the recycling process. The adhesive may have a density less than the fluid used in the recycling process. For example, the adhesive may have a density less than 1.0 g/cm$^3$. The adhesive may also be produced such that the adhesive partially or fully remains in contact with the container. The adhesive may be substantially colorless. The adhesive that remains in contact with the container is such that the adhesive does not adversely affect the recyclability of the material of the container, such as PET. An example of an adhesive that may be used includes that described in U.S. Pat. Nos. 9,139,755; 8,865,824; and 10,357,407 and 9,000,079 and 9,546,304; and U.S. Patent Publication Nos. 2015/0174281, 2015/0173958 and 2013/0158176.

The adhesive may be a hot melt adhesive. The adhesive may comprise polymers and/or copolymers. The terms "polymer" and "copolymer" may be used interchangeably. The adhesive may consist entirely of polymers and/or copolymers and be essentially free from low molecular weight materials such as tackifiers, waxes, oils and such. The adhesive may be essentially free from materials with molecular weights less than 10,000 that are not polymers. The polymers and/or copolymers may be olefinic polymers and/or copolymers comprised of ethylene, propylene, butene, and or pentene monomers (including isomers of these monomers), or higher molecular weight alpha olefins.

The adhesive may include a first propylene-ethylene copolymer having a peak molecular weight Mp between about 4,000 g/mol and about 40,000 g/mol, and a second propylene-ethylene copolymer having a peak molecular weight Mp above 40,000 g/mol. The first copolymer and the second copolymer may be propylene-ethylene copolymers.

The adhesive may further comprise a third polymer having a peak molecular weight Mp of from 70,000 g/mol to 700,000 g/mol. The third polymer may have a peak molecular weight Mp which is at least 10,000 g/mol greater than the peak molecular weight of the second copolymer.

The polymers may preferably be metallocene-technology based, that is produced using a metallocene catalysts, but other catalysts such as Ziegler Natta could also be used. Metallocene-technology based polymers typically have a regular spatial repeat monomer unit distribution and a narrow molecular weight distribution, as is known in the art.

The first and second polymers may be propylene-ethylene copolymers comprising at least 50% by weight of propylene unit, in particular at least 60%, or at least 70%, or at least 80% by weight. The remaining monomers may be ethylene monomers. Optionally other alpha olefin monomers may be present in the co-polymers, for example 4-methyl-1-pentene, pentene-1, 2-methylpentene-1, 3-methylbutene-1, heptene-1, dimethylpentene-1, trimethylbutene-1, ethylpentene-1, methylpentene-1, trimethylpentene-1, methylethylpentene-1, 1-octene, diethylbutene-1, propylpentane-1, decene-1, methylnonene-1, nonene-1, trimethylheptene-1, methylethylbutene-1, dodecene-1, and hexadodecene-1, and combinations thereof.

Suitable metallocene-technology based propylene-ethylene copolymers are commercially available from Clariant under the polymer range Licocene®, with a broad range of properties such as molecular weight, viscosity, crystallinity, etc. US 2016/0053149 A1 assigned to Clariant also describes suitable polymers and copolymers. The polymers may be produced by the processes indicated in EP571,882.

The first copolymer is a propylene-ethylene copolymer having a peak molecular weight Mp between 4,000 g/mol and 40,000 g/mol. The adhesive may comprise from 20% to 80% of the first copolymer, or mixtures of such copolymers, in particular from 30% to 70%, or from 40% to 60%. The first copolymer may in particular have a Mp ranging from 4,000 g/mol to 31,000 g/mol, or from 19,000 g/mol to 26,000 g/mol.

The first copolymer may be a single material as defined above, as this simplifies the compounding and formulation of the hotmelt composition, but the first copolymer may also be a mixture of two or more copolymers falling under this definition.

The first copolymer preferably has a low degree of crystalline character, reflected by an enthalpy of fusion of less than 20 J/g, in particular of less than 15 J/g. A commercial example of the first copolymer is Licocene® PP 1302, from Clariant. Licocene® PP 1302 is sold as granules and is described as a low melting, metallocene-technology based propylene-ethylene copolymer wax, which exhibits a low degree of crystallinity. The Mp of Licocene® PP 1302 was measured to be 24,100 g/mol and its enthalpy of fusion of 11.8 J/g (see measurement method below).

The second copolymer may be a propylene-ethylene copolymer having a peak molecular weight Mp above 40,000 g/mol. The second copolymer may also be a metallocene-technology based propylene-ethylene copolymer. The second copolymer may in particular have a Mp in the range of from 50,000 g/mol to 130,000 g/mol, or from 60,000 g/mol to 110,000 g/mol.

The adhesive may comprise from 10% to 70% by weight of the second copolymer, in particular from 20% to 60%, or from 30% to 50%. The second copolymer may be comprised of a single material as defined, as this simplifies the compounding and formulation of the hotmelt composition, but the second copolymer may also be a mixture of copolymers falling under this definition.

The second copolymer preferably comprises at least one copolymer, as described above, having an enthalpy of fusion, as measured according to the Enthalpy of Fusion Test Method described below, of at least 20 J/g, in particular from 25 J/g to 45 J/g. Polymer in this range can be described as semi-crystalline. The first copolymer may have a lower enthalpy of fusion, thus of less than 20 J/g, in particular from 5 J/g to 15 J/g, and may described as low-crystalline.

A commercial example of a suitable second copolymer is Licocene® PP 3602 which is sold as granules and is described as a low crystalline metallocene-technology based propylene-ethylene copolymer. Another commercial example of the second copolymer is Licocene® PP 1602, also from Clariant, which is sold as granules and is described as a low melting, metallocene-technology based propylene-ethylene copolymer. Licocene® 3602 has a measured enthalpy of fusion of 35.0 J/g, while Licocene® 1622 has an enthalpy of fusion of 16.7 J/g.

The second propylene-ethylene copolymer having a peak molecular weight above 40,000 g/mol can provide good bond between two substrates. Blending a lower molecular weight first copolymer with the higher molecular weight, more crystalline, second copolymer was found to decrease the viscosity and "dilute" of the blend, making the composition more processable. Adhesive formulations based on blends of low-crystalline and semi-crystalline propylene-ethylene copolymers, and essentially free from low molecular weight materials such as tackifiers, waxes and oils, have been found advantageous to provide good bond strength without interfering with the quality of the material reclaimed from the recycling process. Without being bound by theory, it is believed that the low molecular weight components migrate out from the adhesive during recycling and contaminate the materials being reclaimed.

An example of a suitable adhesive formulation is a blend of Licocene® 3602 and Licocene® 1302, which are propylene-ethylene copolymers from Clariant. Licocene 3602 is a relatively highly crystalline polymer, and also has a high viscosity. A blend of both (e.g. 50/50) can still maintain sufficient crystallinity but due to the presence of the lower molecular weight (Licocene 1302), the blend's viscosity is sufficiently low so that it can be applied at desired temperatures around 150-170° C.

The adhesive formulation may further comprise a third polymer and or copolymer. The third polymer may, for example, help prevent "blobbing" at high line speed. The third polymer may have a high peak molecular weight Mp of from 70,000 g/mol to 700,000 g/mol. The third polymer has a peak molecular weight which is at least greater by 10,000 g/mol than the peak molecular weight of the second copolymer, in particular wherein the peak molecular weight of the third polymer is at least 20,000 g/mol or at least 50,000 g/mol higher than the second copolymer. The third polymer may in particular have a peak molecular weight of from 130,000 g/mol to 410,000 g/mol, or from 150,000 g/mol to 360,000 g/mol.

The third polymer may be a homopolymer or a copolymer. The third polymer may be a copolymers comprising different alpha olefin monomers such as ethylene, propylene, 4-methyl-1-pentene, pentene-1, 2-methylpentene-1, 3-methylbutene-1, heptene-1, dimethylpentene-1, trimethylbutene-1, ethylpentene-1, methylpentene-1, trimethylpentene-1, methylethylpentene-1, 1-octene, diethylbutene-1, propylpentane-1, decene-1, methylnonene-1, nonene-1, trimethylheptene-1, methylethylbutene-1, dodecene-1, and hexadodecene-1, and combinations thereof.

The third polymer may be in particular a propylene-ethylene copolymer. The third polymer may be a metallocene-technology based copolymer, in particular a metallocene-technology based propylene-ethylene copolymer.

The third copolymer is preferably comprised of a single material as defined above, as this simplifies the compounding and formulation of the hotmelt composition, but the first copolymer may also be a blend of individual material falling under this definition. The adhesive composition may comprise from 2% to 20% of such a third copolymer, by weight of the adhesive composition, in particular from 5% to 15% by weight of the adhesive composition.

Nonlimiting examples of commercially available third copolymer are Affinity EG 8200G, Engage 8200, Infuse 9817, Vistamaxx 3000, Vistamaxx 6102, Vistamaxx 6202, Vistamaxx 6502, VERsify 4200, VERsify 4301.

The third polymer may be a propylene-ethylene copolymer comprising greater than 80 wt. % of polypropylene units with isotactic stereochemistry. Examples of such copolymers are commercially available as the Vistamaxx series from ExxonMobil. For example, Vistamaxx 6202 and Vistamaxx 6502 are sold as pellets and are described by their manufacturer as primarily composed of isotactic propylene repeat units with random ethylene distribution, produced using a metallocene catalyst technology. Vistamaxx 6202 and 6502 were used as third polymer in the formula examples below. In the aforementioned examples, the product delivery device 56 may include at least one of a bag, a dip tube, and a piston. The bag or portions thereof may be made from a material including at least 90% by weight PET. The bag or portions thereof may be made from a material having a density less than the density of the fluid used in the recycling process. The bag or portions thereof may have a density less than 1.0 g/cm$^3$. The dip tube 26 may include a dip tube adaptor 64 and a tube 66. The dip tube adaptor 64 may be made from a material including at least about 90% by weight PET and may be fixedly joined to at least one of the container 32 and the valve body 54. The tube 66 may be made from a material including at least about 90% by weight PET and may be fixedly or removably joined to the dip tube adaptor. The tube may be made from a material having a density less than 1.0 g/cm$^3$ and may be removably joined to the dip tube adaptor. The tube may be made from a material including polyolefins. If the tube is made from a material other than the same or substantially the same material as at least one of the container, the valve body, and the dip tube adaptor, the tube may be made from a material that has a density less than the density of the fluid used in the recycling process such that the tube floats during the recycling process. If the tube is made from a material that is the same as or substantially the same as at least one of the container, the valve body, and the dip tube adaptor, the tube may sink or float during the recycling process. The piston or portions thereof may be made from a material including at least about 90% by weight PET. The piston or portions thereof may be made from a material having a density less than the density of the fluid used in the recycling process. The piston or portions thereof may have a density less than 1.0 g/cm$^3$.

In the aforementioned examples, the valve stem 62 may have the following properties. The valve stem 62 may be made of a material that has a density less than 1.0 g/cm$^3$. The valve stem 62 may be made from a material that has a density less than the density of the fluid used in the recycling process. The valve stem 62 may be made from a material including at least about 90% by weight PET.

The following is a discussion of various examples of aerosol dispensers as evaluated under the APR benchmark process 300 and the critical guidance process 400 and the data obtained from those processes.

Tables 1-6 include data on the characteristics of various polymeric aerosol dispensers, the control articles, and the L, $\Delta a^*$, $\Delta b^*$, and percentage of $\Delta$ haze values for those polymeric aerosol dispensers after being subject to the benchmark process as discussed above. Table 1 includes the details of the polymeric aerosol dispenser, also referred to herein as the innovation article, including the materials of the various components of the polymeric aerosol dispenser and the connection of those components. In Table 1, separably joined is abbreviated as "SJ" and fixedly joined is abbreviated as "FJ" for conciseness. Tables 2-5 include the L, Δa*, Δb*, and percentage of Δ haze values upon subjecting the various polymeric aerosol dispensers to the benchmark process. Tables 2 includes L values of the innovation plaque and Tables 3-5 include the data on Δa*, Δb*, and percentage of Δ haze values upon comparing the innovation plaque with the control plaque after subjecting the polymeric aerosol dispensers outlined in Table 1 to the benchmark process. The L, Δa*, Δb*, and percentage of Δ haze values are based on the percentage of ground innovation article combined with the percentage of ground control article. The benchmark process requires the amount of ground innovation article and ground control article to be a total of 10 lbs. Thus, of that total 10 lbs, for example, 1% may be ground innovate article and 99% may be ground control article. The change in percentage of ground innovation article to the percentage of ground control article affects the L, Δa*, Δb*, and percentage of Δ haze values, which is reflected in Tables 2-5. Table 6 includes that L*, a*, b*, and haze (%) values for the control article that was used in each of Examples 1-11.

TABLE 1

Component Material and Connection

| | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|
| Container | PET | PET | PET | PET | PET | PET | PET | PET | PET | PET | PET |
| Actuator | PP | PP | PP | PP | PP | PP | PP | PP | PP | PP | PP |
| Actuator attachment | SJ | SJ | SJ | SJ | SJ | SJ | SJ | SJ | SJ | SJ | SJ |
| Base Cup | HPDE | HPDE | HPDE | HPDE | HPDE | None | None | None | None | HPDE | HPDE |
| Base Cup attachment | Adhesive[1] | Adhesive[1] | Adhesive[2] | Adhesive[2] | Adhesive[2] | NA | NA | NA | NA | Adhesive[7] | Adhesive[8] |
| Valve body | PET | PET | PET | PET | PET | PET | PET | PET | PET | PET | PET |
| Valve body attachment | Welded to container | Welded to container | Welded to container | Welded to container | Welded to container | Welded to container | Welded to container | Welded to container | Welded to container | Welded to container | Welded to container |
| Valve Stem | PET | PET | PP | PP | PP | PP | PP | PP | PP | PP | PP |
| Valve Stem attachment | SJ | SJ | SJ | SJ | SJ | SJ | SJ | SJ | SJ | SJ | SJ |
| Valve Seal | Black Cross-linked Rubber[4] | Colorless TPE[3] | Colorless TPE[3] | Colorless TPE[3] | None | Colorless TPE[6] | Colorless TPE[3] | Colorless TPE[6] | Colorless TPE[6] | Colorless TPE[6] | Colorless TPE[6] |
| Valve Seal Attachment | SJ O-rings | FJ Over-molded | FJ Over-molded | SJ Snap-fit | NA | SJ Inserted | FJ Over-molded | SJ Inserted | SJ Inserted | SJ Inserted | SJ Inserted |
| Resilient member | Rubber[5] | Colorless TPE[3] | Colorless TPE[3] | Colorless TPE[3] | Colorless TPE[3] | Colorless TPE[3] | Colorless TPE[3] | Colorless TPE[3] | Colorless TPE[3] | Colorless TPE[9] | Colorless TPE[9] |
| Resilient member attachment | SJ | FJ Over-molded | SJ to PET FJ to PP engagement member | SJ to PET FJ to PP engagement member | SJ to PET FJ to PP engagement member | SJ | SJ | SJ | SJ | SJ | SJ |
| Product Delivery Device (A) | PET dip tube adapter | PET dip tube adapter | PET dip tube adapter | PET dip tube adapter | PET dip tube adapter | PET dip tube adapter | PET dip tube adapter | PET bag | PET dip tube adapter | PET dip tube adapter | PET dip tube adapter |
| Product Delivery Device (A) attachment | FJ Welded to container | FJ Welded to container | FJ Welded to container | FJ Welded to container | FJ Welded to container | FJ Welded to container | FJ Welded to container | FJ Welded to container | FJ Welded to container | FJ Welded to container | FJ Welded to container |
| Product Delivery Device (B) | LLDPE dip-tube | LLDPE dip-tube | LLDPE dip-tube | LLDPE dip-tube | LLDPE dip-tube | LLDPE dip-tube | LLDPE dip-tube | NA | LLDPE dip-tube | LLDPE dip-tube | LLDPE dip-tube |
| Product Delivery Device (B) attachment | SJ friction-fit to Dip-tube adapter | SJ friction-fit to Dip-tube adapter | SJ friction-fit to Dip-tube adapter | SJ friction-fit to Dip-tube adapter | SJ friction-fit to Dip-tube adapter | SJ snap-fit | SJ snap-fit | NA | SJ friction-fit to Dip-tube adapter | SJ friction-fit to Dip-tube adapter | SJ friction-fit to Dip-tube adapter |

[1] Gorilla Glue-hot melt adhesive
[2] Bostik H7911334B-hot melt adhesive (water insoluble, softens @ 172F)-(available from Bostik)
[3] Styrenic TPE, catalogue #HTC8791-24 (available from Kraiburg)-density = 0.96 g/cm$^3$-0.97 g/cm$^3$
[4] Buna rubber (available from Grainger)-density = 1.16 g/cm$^3$
[5] Neoprene (available from Grainger)-density = 0.967 g/cm$^3$
[6] Thermoplastic Elastomer (TPE) catalogue #HTF9343-239 (available from Kraiburg), density = 0.90 g/cm$^3$-0.91 g/cm$^3$
[7] IFS XB 3-55-5-hot melt adhesive
[8] IFS XJF 6-107-3-hot melt adhesive
[9] Thermoplastic Elastomer (TPE) catalogue #HTF8796/36 (available from Kraiburg), density = 0.88 g/cm$^3$-0.89 g/cm$^3$

TABLE 2

Benchmark Process-L Value

| | Example 1 L* | Example 2 L* | Example 3 L* | Example 4 L* | Example 5 L* | Example 6 L* | Example 7 L* | Example 8 L* | Example 9 L* | Example 10 L* | Example 11 L* |
|---|---|---|---|---|---|---|---|---|---|---|---|
| 1% Ground Innovation Article[10] | 89.32 | 93.48 | 93.34 | 93.2 | 93.54 | 93.55 | 93.84 | 93.67 | 89.74 | NA | NA |
| 5% Ground Innovation Article[11] | 87.44 | 93.9 | 92.95 | 92.79 | 93.45 | 93.56 | 92.96 | 93.63 | 89.79 | 93.86 | 94.04 |
| 10% Ground Innovation Article[12] | 88.70 | 93.32 | 91.79 | 92.39 | 93.26 | 93.69 | 93.19 | 92.48 | 89.81 | 94.00 | 94.12 |
| 25% Ground Innovation Article[13] | 88.70 | 91.01 | 91.67 | 92.01 | 93.11 | 93.66 | 91.3 | 92.34 | 89.12 | 93.93 | 94.13 |
| 50% Ground Innovation Article[14] | 88.19 | 91.25 | 90.95 | 91.32 | 93.19 | 92.88 | 91.61 | 93.36 | 88.47 | 93.79 | 93.56 |

[10] 1% ground innovation article and 99% ground control article, such that the total weight of the ground innovation article and the ground control article is 10 lbs.
[11] 5% ground innovation article and 95% ground control article, such that the total weight of the ground innovation article and the ground control article is 10 lbs.
[12] 10% ground innovation article and 90% ground control article, such that the total weight of the ground innovation article and the ground control article is 10 lbs.
[13] 25% ground innovation article and 75% ground control article, such that the total weight of the ground innovation article and the ground control article is 10 lbs.
[14] 50% ground innovation article and 50% ground control article, such that the total weight of the ground innovation article and the ground control article is 10 lbs.

TABLE 3

Benchmark Process-delta a*

| | Example 1 Δa* | Example 2 Δa* | Example 3 Δa* | Example 4 Δa* | Example 5 Δa* | Example 6 Δa* | Example 7 Δa* | Example 8 Δa* | Example 9 Δa* | Example 10 Δa* | Example 11 Δa* |
|---|---|---|---|---|---|---|---|---|---|---|---|
| 1% Ground Innovation Article[15] | −0.22 | −0.03 | −0.21 | 0.07 | −0.10 | −0.05 | −0.02 | −0.03 | −0.08 | NA | NA |
| 5% Ground Innovation Article[16] | −0.32 | 0.04 | −0.14 | 0.06 | −0.12 | −0.01 | 0.08 | −0.02 | 0.02 | −0.07 | 0.06 |
| 10% Ground Innovation Article[17] | −0.14 | 0.00 | −0.11 | −0.09 | −0.16 | −0.10 | 0.04 | −0.28 | 0.02 | 0.03 | 0.04 |
| 25% Ground Innovation Article[18] | −0.22 | 0.17 | 0.04 | 0.06 | −0.07 | 0.02 | 0.28 | −0.18 | 0.04 | 0.02 | 0.06 |
| 50% Ground Innovation Article[19] | −0.12 | 0.24 | 0.09 | −0.01 | −0.10 | 0.12 | 0.26 | 0.07 | 0.10 | 0.04 | 0.06 |

[15] 1% ground innovation article and 99% ground control article, such that the total weight of the ground innovation article and the ground control article is 10 lbs.
[16] 5% ground innovation article and 95% ground control article, such that the total weight of the ground innovation article and the ground control article is 10 lbs.
[17] 10% ground innovation article and 90% ground control article, such that the total weight of the ground innovation article and the ground control article is 10 lbs.
[18] 25% ground innovation article and 75% ground control article, such that the total weight of the ground innovation article and the ground control article is 10 lbs.
[19] 50% ground innovation article and 50% ground control article, such that the total weight of the ground innovation article and the ground control article is 10 lbs.

TABLE 4

Benchmark Process-delta a*

| | Example 1 Δb* | Example 2 Δb* | Example 3 Δb* | Example 4 Δb* | Example 5 Δb* | Example 6 Δb* | Example 7 Δb* | Example 8 Δb* | Example 9 Δb* | Example 10 Δb* | Example 11 Δb* |
|---|---|---|---|---|---|---|---|---|---|---|---|
| 1% Ground Innovation Article[20] | 1.43 | 0.01 | 0.96 | 0.12 | 0.27 | 0.2 | 0.02 | 0.22 | 0.41 | NA | NA |
| 5% Ground Innovation Article[21] | 1.36 | 0.4 | 1.17 | 0.64 | 0.4 | 0.17 | 0.71 | 0.14 | 0.08 | 0.31 | −0.32 |

TABLE 4-continued

Benchmark Process-delta a*

| | Example 1 Δb* | Example 2 Δb* | Example 3 Δb* | Example 4 Δb* | Example 5 Δb* | Example 6 Δb* | Example 7 Δb* | Example 8 Δb* | Example 9 Δb* | Example 10 Δb* | Example 11 Δb* |
|---|---|---|---|---|---|---|---|---|---|---|---|
| 10% Ground Innovation Article[22] | 1.69 | 0.72 | 2.63 | 1.67 | 0.71 | 0.56 | 0.74 | 1.19 | 0.14 | −0.36 | −0.27 |
| 25% Ground Innovation Article[23] | 2.35 | 2.18 | 2.31 | 1.64 | 0.81 | 0.12 | 1.75 | 1.13 | 0.7 | −0.16 | −0.40 |
| 50% Ground Innovation Article[24] | 2.31 | 2.36 | 3.04 | 2.34 | 0.74 | 0.6 | 1.63 | 0.07 | 0.96 | −0.18 | 0.25 |

[20] 1% ground innovation article and 99% ground control article, such that the total weight of the ground innovation article and the ground control article is 10 lbs.
[21] 5% ground innovation article and 95% ground control article, such that the total weight of the ground innovation article and the ground control article is 10 lbs.
[22] 10% ground innovation article and 90% ground control article, such that the total weight of the ground innovation article and the ground control article is 10 lbs.
[23] 25% ground innovation article and 75% ground control article, such that the total weight of the ground innovation article and the ground control article is 10 lbs.
[24] 50% ground innovation article and 50% ground control article, such that the total weight of the ground innovation article and the ground control article is 10 lbs.

TABLE 5

Benchmark Process-delta Haze (%)

| | Example 1 Δ haze (%) | Example 2 Δ haze (%) | Example 3 Δ haze (%) | Example 4 Δ haze (%) | Example 5 Δ haze (%) | Example 6 Δ haze (%) | Example 7 Δ haze (%) | Example 8 Δ haze (%) | Example 9 Δ haze (%) | Example 10 Δ haze (%) | Example 11 Δ haze (%) |
|---|---|---|---|---|---|---|---|---|---|---|---|
| 1% Ground Innovation Article[25] | 2.29 | 0.35 | 1.19 | 1.88 | 0.97 | 0.79 | 0.17 | 0.07 | 0.19 | NA | NA |
| 5% Ground Innovation Article[26] | 3.87 | 0.56 | 5.71 | 4.83 | 0.36 | 1.24 | 11.65 | 0.89 | 0.51 | −0.34 | −0.17 |
| 10% Ground Innovation Article[27] | 4.59 | 12.9 | 13.81 | 4.6 | 1.37 | 0.60 | 14.14 | 1.48 | 0.57 | −0.02 | −0.05 |
| 25% Ground Innovation Article[28] | 6.57 | 39.64 | 27.63 | 6.32 | 2.86 | 1.10 | 47.35 | 2.03 | 5.36 | −0.38 | 0.08 |
| 50% Ground Innovation Article[29] | 9.60 | 41.41 | 32.28 | 13.2 | 2.11 | 7.66 | 43.92 | 3.19 | 10.81 | 0.30 | 5.62 |

[25] 1% ground innovation article and 99% ground control article, such that the total weight of the ground innovation article and the ground control article is 10 lbs.
[26] 5% ground innovation article and 95% ground control article, such that the total weight of the ground innovation article and the ground control article is 10 lbs.
[27] 10% ground innovation article and 90% ground control article, such that the total weight of the ground innovation article and the ground control article is 10 lbs.
[28] 25% ground innovation article and 75% ground control article, such that the total weight of the ground innovation article and the ground control article is 10 lbs.
[29] 50% ground innovation article and 50% ground control article, such that the total weight of the ground innovation article and the ground control article is 10 lbs.

TABLE 6

Control Article

| | Material Type | L* | a* | b* | haze (%) |
|---|---|---|---|---|---|
| Example 1 Control Article | PET | 89.51 | −0.77 | 2.62 | 6.35 |
| Example 2 Control Article | PET | 93.81 | −0.5 | 2.41 | 1.99 |
| Example 3-5 Control Articles | PET | 93.6 | −0.73 | 3.12 | 1.73 |
| Example 6-8 Control Articles | PET | 93.77 | −0.56 | 2.31 | 1.95 |
| Example 9 Control Article | PET | 89.47 | −0.63 | 3.36 | 7.2 |
| Example 10-11 Control Articles | PET | 93.96 | −0.59 | 2.66 | 1.94 |

The polymeric aerosol dispenser of Example 1 includes the following components:

A. a container 32 that is made from a material including at least about 90% by weight PET;

B. a base cup including HDPE that is separably joined to the container via a hot melt adhesive;

C. a valve body 54 that is made from material including at least about 90% by weight PET with the valve body 54 being fixedly joined to the container 32;

D. a valve seal 82 made from a dark-colored, cross-linked, rubber material in the form of O-rings which are separably joined to the valve body 54;

E. a valve stem 62 that is made from a material including at least about 90% by weight PET and being moveably disposed (e.g. separably joined to the valve body) within the inner passageway 74 of the valve body 54;

F. a resilient member including a colorless cross-linked rubber material that is separably joined to the valve body;
G. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
H. an actuator 46 that is made from a material including polypropylene (PP) and removably joined to at least one of the valve body 54 and the container 32.

The Example 1 aerosol dispenser was subject to the benchmark process 300. The resulting innovation plaques formed from processing the Example 1 aerosol dispenser at the various different load-level percentages of ground innovation article show: L>82 at all load-level percentages; $\Delta a^* < 1.5$ at all load-level percentages; $\Delta b^* < 1.5$ at load-level percentages less than 5%; and $\Delta$ haze (%)<10 at all load-level percentages. While it may appear that Example 1 satisfies the criteria set forth by APR for the L, $\Delta a^*$, $\Delta b^*$, and $\Delta$ haze (%) at certain load-level percentages, the innovation plaques included visible black specks, that would have made the recycled material unsuitable for re-use in future articles, such as consumer products containers. The black specks may be attributed to the use of a cross-linked rubber material, even one that is separably joined to the container. It is likely that the cross-linked rubber material sank with the PET and, thus, adversely affected the recycled PET.

The polymeric aerosol dispenser of Example 2 includes the following components:
A. a container 32 that is made from a material including at least about 90% by weight PET;
B. a base cup including HDPE that is separably joined to the container via a hot melt adhesive that softens during processing;
C. a valve body 54 that is made from material including at least about 90% by weight PET with the valve body 54 being fixedly joined to the container 32;
D. a valve seal 82 that is made from a colorless, thermoplastic elastomeric material that is fixedly joined to the valve body 54;
E. a valve stem 62 that is made from a material including at least about 90% by weight PET and being moveably disposed (e.g. separably joined to the valve body) within the inner passageway 74 of the valve body 54;
F. a valve seal including a colorless thermoplastic elastomer that is fixedly joined to the valve body;
G. a resilient member including a colorless thermoplastic elastomer that is fixedly joined to the valve body;
H. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
I. an actuator 46 that is made from a material including polypropylene and removably joined to at least one of the valve body 54 and the container 32.

The Example 2 aerosol dispenser was subject to the benchmark process 300. The resulting innovation plaques formed from processing the Example 2 aerosol dispenser at the various different load-level percentages of ground innovation article show: L>82 at all load-level percentages; $\Delta a^* < 1.5$ at all load-level percentages; $\Delta b^* < 1.5$ at load-level percentages up to 10% but >1.5 at load-level percentages 25% and greater; and $\Delta$ haze (%)<10 at load-level percentages up to 5% (5% ground innovation article) but >10 $\Delta$ haze (%) at load-level percentages 10% (10% ground innovation article) and greater. It is believed that the relatively high values for $\Delta b^*$ and $\Delta$ haze (%) may be due to the failure of the valve seal being separable from the valve body, resulting in the elastomeric material appearing in the plaque. Even when the elastomeric material was colorless, the plaques were still affected.

The polymeric aerosol dispenser of Example 3 includes the following components:
A. a container 32 that is made from a material including at least about 90% by weight PET;
B. a base cup including HDPE that is separably joined to the container via a hot melt adhesive;
C. a valve body 54 that is made from material including at least about 90% by weight PET with the valve body 54 being fixedly joined to the container 32;
D. a valve seal 82 that is made from a colorless, thermoplastic elastomeric material which is fixedly joined to the valve body 54;
E. a valve stem 62 that is made from polypropylene (PP) and being moveably disposed (e.g. separably joined to the valve body) within the inner passageway 74 of the valve body 54;
F. a resilient member including a colorless thermoplastic elastomer that is separably joined to the valve body;
G. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
H. an actuator 46 that is made from a material including polypropylene and removably joined to at least one of the valve body 54 and the container 32.

The Example 3 aerosol dispenser was subject to the benchmark process 300. The resulting innovation plaques formed from processing the Example 3 aerosol dispenser at the various different load-level percentages of ground innovation article show: L>82 at all load-level percentages; $\Delta a^* < 1.5$ at all load-level percentages; $\Delta b^* < 1.5$ at load-level percentages up to 5% but >1.5 at load-level percentages 10% and greater; and $\Delta$ haze (%)<10 at load-level percentages up to 5% but >10 at load-level percentages 10% and greater. It is believed that the that relatively high values for $\Delta b^*$ and $\Delta$ haze (%) may be due to the failure of the valve seal to be separable from the valve body resulted in the elastomeric material appearing in the innovation plaque. While the resilient member was made to be separably joined (e.g. versus example #2), the material from the valve seal may still have adversely affected the innovation plaque. It is also considered that the adhesive softened during processing and that a portion of the adhesive adversely affected the innovation plaque.

The polymeric aerosol dispenser of Example 4 includes the following components:
A. a container 32 that is made from a material including at least about 90% by weight PET;
B. a base cup including HDPE that is separably joined to the container via a hot melt adhesive;
C. a valve body 54 that is made from material including at least about 90% by weight PET with the valve body 54 being fixedly joined to the container 32;
D. a valve seal 82 that is made from a colorless, thermoplastic elastomeric material that is separably joined to the valve body 54;
E. a valve stem 62 that is made from polypropylene (PP) and being moveably disposed (e.g. separably joined to the valve body) within the inner passageway 74 of the valve body 54;

F. a resilient member including a colorless thermoplastic elastomer that is separably joined to the valve body;
G. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
H. an actuator 46 that is made from a material including polypropylene and removably joined to at least one of the valve body 54 and the container 32.

The Example 4 aerosol dispenser was subject to the benchmark process 300. The resulting innovation plaques formed from processing the Example 4 aerosol dispenser at the various different load-level percentages of ground innovation article show: L>82 at all load-level percentages; $\Delta a^* < 1.5$ at all load-level percentages; $\Delta b^* < 1.5$ at load-level percentages up to 5% but >1.5 at load-level percentages 10% and greater; $\Delta$ haze (%)<10 at load-level percentages up to 25% but >10 at a load-level percentage of 50%. It is believed that the relatively high values for $\Delta b^*$ and $\Delta$ haze (%) may be due to residual adhesive in the innovation plaque. The adhesive may have softened during processing and a portion of the adhesive may have adversely affected the innovation plaque.

The polymeric aerosol dispenser of Example 5 including the following components:
A. a container 32 that is made from a material including at least about 90% by weight PET;
B. a base cup including HDPE that is separably joined to the container via a hot melt adhesive;
C. a valve body 54 that is made from material including at least about 90% by weight PET with the valve body 54 being fixedly joined to the container 32;
D. a valve stem 62 that is made from polypropylene (PP) and being moveably disposed (e.g. separably joined to the valve body) within the inner passageway 74 of the valve body 54;
E. a resilient member including a colorless thermoplastic elastomer that is separably joined to the valve body;
F. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
G. an actuator 46 that is made from a material including polypropylene and removably joined to at least one of the valve body 54 and the container 32.

The Example 5 aerosol dispenser was subject to the benchmark process 300. The resulting innovation plaques formed from processing the Example 5 aerosol dispenser at the various different load-level percentages of ground innovation article show: L>82 at all load-level percentages; $\Delta a^* < 1.5$ at all load-level percentages; $\Delta b^* < 1.5$ at all load-level percentages; $\Delta$ haze (%)<10 at all load-level percentages.

The polymeric aerosol dispenser of Example 6 includes the following components:
A. a container 32 that is made from a material including at least about 90% by weight PET;
B. a valve body 54 that is made from material including at least about 90% by weight PET with the valve body 54 being fixedly joined to the container 32;
C. a valve seal 82 that is made from a colorless, thermoplastic elastomeric material that is separably joined to the valve body 54;
D. a valve stem 62 that is made from polypropylene (PP) and being moveably disposed (e.g. separably joined to the valve body) within the inner passageway 74 of the valve body 54;
E. a resilient member including a colorless thermoplastic elastomer that is separably joined to the valve body;
F. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
G. an actuator 46 that is made from a material including polypropylene and removably joined to at least one of the valve body 54 and the container 32.

The Example 6 aerosol dispenser was subject to the benchmark process 300. The resulting innovation plaques formed from processing the Example 6 aerosol dispenser at the various different load-level percentages of ground innovation article show: L>82 at all load-level percentages; $\Delta a^* < 1.5$ at all load-level percentages; $\Delta b^* < 1.5$ at all load-level percentages; $\Delta$ haze (%)<10 at all load-level percentages.

The polymeric aerosol dispenser of Example 7 includes the following components:
A. a container 32 that is made from a material including at least about 90% by weight PET;
B. a valve body 54 that is made from material including at least about 90% by weight PET with the valve body 54 being fixedly joined to the container 32;
C. a valve seal 82 that is made from a colorless, thermoplastic elastomeric material that is fixedly joined to the valve body 54;
D. a valve stem 62 that is made from polypropylene (PP) and being moveably disposed (e.g. separably joined to the valve body) within the inner passageway 74 of the valve body 54;
E. a resilient member including a colorless thermoplastic elastomer that is separably joined to the valve body;
F. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
G. an actuator 46 that is made from a material including polypropylene and removably joined to at least one of the valve body 54 and the container 32.

The Example 7 aerosol dispenser was subject to the benchmark process 300. The resulting innovation plaques formed from processing the Example 7 aerosol dispenser at the various different load-level percentages of ground innovation article show: L>82 at all load-level percentages; $\Delta a^* < 1.5$ at all load-level percentages; $\Delta b^* < 1.5$ at load-level percentages up to 10% and >1.5 at load-level percentages 25% and greater; $\Delta$ haze (%)<10 at load-level percentages up to 1% and >10 at load-level percentages 5% and greater. It is believed that the relatively high values for $\Delta b^*$ and $\Delta$ haze (%) may be due to the valve seal being fixedly joined to the valve body so that residual material from the valve seal may have adversely affected the innovation plaque.

The polymeric aerosol dispenser of Example 8 includes the following components:
A. a container 32 that is made from a material including at least about 90% by weight PET;
B. a valve body 54 that is made from material including at least about 90% by weight PET with the valve body 54 being fixedly joined to the container 32;

C. a valve seal 82 that is made from a colorless, thermoplastic elastomeric material that is separably joined to the valve body 54;
D. a valve stem 62 that is made from polypropylene (PP) and being moveably disposed (e.g. separably joined to the valve body) within the inner passageway 74 of the valve body 54;
E. a resilient member including a colorless thermoplastic elastomer that is separably joined to the valve body;
F. a bag that is made from a material including at least about 90% by weight PET that is fixedly joined to at least one of the valve body 54 and the container 32; and
G. an actuator 46 that is made from a material including polypropylene and removably joined to at least one of the valve body 54 and the container 32.

The Example 8 aerosol dispenser was subject to the benchmark process 300. The resulting innovation plaques formed from processing the Example 8 aerosol dispenser at the various different load-level percentages of ground innovation article show: L>82 at all load-level percentages; Δa*<1.5 at all load-level percentages; Δb*<1.5 at all load-level percentages; and Δ haze (%)<10 at all load-level percentages.

The polymeric aerosol dispenser of Example 9 includes the following components:
A. a container 32 that is made from a material including at least about 90% by weight PET;
B. a valve body 54 that is made from material including at least about 90% by weight PET with the valve body 54 being fixedly joined to the container 32;
C. a valve seal 82 that is made from a colorless, thermoplastic elastomeric material that is fixedly joined to the valve body 54;
D. a valve stem 62 that is made from polypropylene (PP) and being moveably disposed (e.g. separably joined to the valve body) within the inner passageway 74 of the valve body 54;
E. a resilient member including a colorless thermoplastic elastomer that is separably joined to the valve body;
F. a PET bag as the product delivery device; and
G. an actuator 46 that is made from a material including polypropylene and removably joined to at least one of the valve body 54 and the container 32.

The Example 9 aerosol dispenser was subject to the benchmark process 300. The resulting innovation plaques formed from processing the Example 9 aerosol dispenser at the various different load-level percentages of ground innovation article show: L>82 at all load-level percentages; Δa*<1.5 at all load-level percentages; Δb*<1.5 at all load-level percentages; and Δ haze (%)<10 at load-level percentages up to 25% and >10 at a load-level percentage of 50%.

As discussed herein, another process for evaluating the recyclability of the polymeric aerosol dispenser is the critical guidance process 400. The critical guidance process 400 requires a mixture of 50% ground innovation article with 50% ground control article, and the total weight of the mixture of ground innovation article with ground control article to be 40 lbs. Example 10 below details a polymeric aerosol dispenser that was subject to the critical guidance process 400 and the resulting data. Table 7 includes the details of the polymeric aerosol dispenser that was subject to the critical guidance process 400. Table 7 includes the components of the polymeric aerosol dispenser and the connection of those components. Table 8 includes the data obtained from the CG post innovation plaque and the CG post control plaque. The control article that was used in the critical guidance process 400 of Example 10 was PET and had an L* value of 93.84, an a* value of −0.68, a b* value of 3.34, and a haze (%) value of 1.68.

The Example 10 aerosol dispenser was subject to the benchmark process 300. The resulting innovation plaques formed from processing the Example 10 aerosol dispenser at the various different load-level percentages of ground innovation article show: L>82 at all load-level percentages; Δa*<1.5 at all load-level percentages; Δb*<1.5 at all load-level percentages; Δ haze (%)<10 at all load-level percentages.

The polymeric aerosol dispenser of Example 10 includes the following components:
A. a container 32 that is made from a material including at least about 90% by weight PET;
B. a base cup including HDPE that is separably joined to the container via a hot melt adhesive;
C. a valve body 54 that is made from material including at least about 90% by weight PET with the valve body 54 being fixedly joined to the container 32;
D. a valve seal 82 that is made from a colorless, thermoplastic elastomeric material that is separably joined to the valve body 54;
E. a valve stem 62 that is made from polypropylene (PP) and being moveably disposed (e.g. separably joined to the valve body) within the inner passageway 74 of the valve body 54;
F. a resilient member including a colorless thermoplastic elastomer that is separably joined to the valve body;
G. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and
H. an actuator 46 that is made from a material including polypropylene and removably joined to at least one of the valve body 54 and the container 32.

The Example 11 aerosol dispenser was subject to the benchmark process 300. The resulting innovation plaques formed from processing the Example 11 aerosol dispenser at the various different load-level percentages of ground innovation article show: L>82 at all load-level percentages; Δa*<1.5 at all load-level percentages; Δb*<1.5 at all load-level percentages; Δ haze (%)<10 at all load-level percentages.

The polymeric aerosol dispenser of Example 11 includes the following components:
A. a container 32 that is made from a material including at least about 90% by weight PET;
B. a base cup including HDPE that is separably joined to the container via a hot melt adhesive;
C. a valve body 54 that is made from material including at least about 90% by weight PET with the valve body 54 being fixedly joined to the container 32;
D. a valve seal 82 that is made from a colorless, thermoplastic elastomeric material that is separably joined to the valve body 54;
E. a valve stem 62 that is made from polypropylene (PP) and being moveably disposed (e.g. separably joined to the valve body) within the inner passageway 74 of the valve body 54;
F. a resilient member including a colorless thermoplastic elastomer that is separably joined to the valve body;
G. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and H. an actuator 46 that is made from a material including polypropylene and removably joined to at least one of the valve body 54 and the container 32.

The polymeric aerosol dispenser of Examples 12, 13 and 14 was subject to the critical guidance process 400 according to the following details regarding that process:

Equipment:
Grinder with ⅜" Screen
Pilot Plant Wash System
Air Dry
Kice Elutriator
Desiccant Dryer
Arburg Injection Press with a 3 mm plaque mold
Spectrophotometer Critical Guidance Procedure Overview:
Materials (40 lbs) were received and ground to ⅜" Screen at a 50% control articles with 50% innovation articles per APR guideline PET-P-03

Washes were performed with floatable material being removed as specified by APR guidelines per PET-P-04
  The flakes are exposed to a caustic wash solution of 0.3% by weight surfactant (6.0 gms or 5.7 ml per 2,000 ml water) and 1.0% by weight caustic (20 gms NaOH per 2,000 ml water) at 190° F. Wash was highly agitated (1,000 RPM) at 88+2° C. for 15 minutes.

Rinse: Flakes are drained of caustic wash solution and rinsed with room temperature water with agitation in order to remove the caustic solution.

Sink/Float: Floatables were removed in a sink/float tub which allowed pieces to separate from the flake materials Control and innovation materials were then air dried; ambient air dried with no heat or vacuum.

Control and innovation were elutriated with calibration set to remove <1.2% of control material "lights" per APR guideline PET-P-05

Control and innovation were submitted for Extrusion/Pelletization per APR guideline PET-P-06 (Extruder back pressure was recorded, and the material moisture was recorded.)

Control and innovation IV (Intrinsic Viscosity) may be recorded after extrusion/pelletization Control and Test materials were then made into 3 mm plaques (minimum of 50 each) for color and black spec data per APR guideline PET-P-08. The material moisture may be recorded.

TABLE 7

Component Material and Connection
Example 12-14

| Component Primary Material | Example 12 | Example 13 | Example 14 |
|---|---|---|---|
| Container | PET | PET | PET |
| Actuator | PP | PP | PP |
| Actuator attachment | Separably joined | SJ | SJ |
| Base Cup | None | HDPE | HDPE |
| Base Cup attachment | NA | Adhesive[29] | Adhesive[29] |
| Valve body | PET | PET | PET |
| Valve Body attachment | Welded to container | Welded to container | Welded to container |
| Valve Stem | PP | PP | PP |
| Valve Stem attachment | Separably joined | SJ | SJ |
| Valve Seal | Colorless TPE[27] | Colorless TPE[27] | Colorless TPE[27] |
| Valve Seal Attachment | Separably joined Over-molded | FJ Over-molded | FJ Over-molded |
| Resilient member | Colorless TPE[28] | Colorless TPE[28] | Colorless TPE[28] |
| Resilient Member attachment | Separably joined | SJ | SJ |
| Product Delivery Device (A) | PET dip tube adapter | PET dip tube adapter | PET bag |
| Product Delivery Device (A) attachment | Fixedly joined Welded to container | FJ Welded to container | FJ Welded to container |
| Product Delivery Device (B) | LLDPE dip-tube | LLDPE dip-tube | NA |
| Product Delivery Device (B) attachment | Separably joined Friction-fit to Dip-tube adapter | SJ friction-fit to Dip-tube adapter | NA |

[27]Thermoplastic Elastomer (TPE) catalogue #HTF9343-239 (available from Kraiburg), density = 0.90 g/cm³-0.91 g/cm³
[28]Thermoplastic Elastomer (TPE) catalogue #HTF8796-36 (available from Kraiburg), density = 0.886 g/cm³
[29]IFS XB 3-55-5—hot melt adhesive

TABLE 8

Data from Critical Guidance Process - Example 12-14
50% innovation article; 50% control article

|  | Example 12 | Example 13 | Example 14 |
|---|---|---|---|
| L* | 93.96 | 93.70 | 93.13 |
| Δa* | 0.19 | 0.04 | 0.12 |
| Δb* | −0.91 | −0.08 | 0.32 |
| Δ haze (%) | 1.32 | 0.86 | 2.32 |

The polymeric aerosol dispenser of Example 12 includes the following components:

A. a container 32 that is made from a material including at least about 90% by weight PET;

B. a valve body 54 that is made from material including at least about 90% by weight PET with the valve body 54 being fixedly joined to the container 32;

C. a valve seal 82 that is made from a colorless, thermoplastic elastomeric material that is separably joined to the valve body 54;

D. a valve stem 62 that is made from polypropylene (PP) and being moveably disposed (e.g. separably joined to the valve body) within the inner passageway 74 of the valve body 54;

E. a resilient member including a colorless thermoplastic elastomer that is separably joined to the valve body;

F. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and G. an actuator 46 that is made from a material including polypropylene and removably joined to at least one of the valve body 54 and the container 32.

The polymeric aerosol dispenser of Example 13 includes the following components:

A. a container 32 that is made from a material including at least about 90% by weight PET;

B. a base cup including HDPE that is separably joined to the container via a hot melt adhesive;

C. a valve body 54 that is made from material including at least about 90% by weight PET with the valve body 54 being fixedly joined to the container 32;

D. a valve seal 82 that is made from a colorless, thermoplastic elastomeric material that is separably joined to the valve body 54;

E. a valve stem 62 that is made from polypropylene (PP) and being moveably disposed (e.g. separably joined to the valve body) within the inner passageway 74 of the valve body 54;

F. a resilient member including a colorless thermoplastic elastomer that is separably joined to the valve body;

G. a dip-tube as the product delivery device 56 consisting of two parts—a dip-tube adapter including at least about 90% PET that is fixedly joined to at least one of the valve body 54 and the container 32 and a LLDPE tube separably joined to the dip-tube adapter; and H. an actuator 46 that is made from a material including polypropylene and removably joined to at least one of the valve body 54 and the container 32.

The polymeric aerosol dispenser of Example 14 includes the following components:

A. a container 32 that is made from a material including at least about 90% by weight PET;

B. a base cup including HDPE that is separably joined to the container via a hot melt adhesive;

C. a valve body 54 that is made from material including at least about 90% by weight PET with the valve body 54 being fixedly joined to the container 32;

D. a valve seal 82 that is made from a colorless, thermoplastic elastomeric material that is separably joined to the valve body 54;

E. a valve stem 62 that is made from polypropylene (PP) and being moveably disposed (e.g. separably joined to the valve body) within the inner passageway 74 of the valve body 54;

F. a resilient member including a colorless thermoplastic elastomer that is separably joined to the valve body;

G. a PET bag as the product delivery device; and

H. an actuator 46 that is made from a material including polypropylene and removably joined to at least one of the valve body 54 and the container 32.

The Examples 12-14 aerosol dispenser was subject to the critical guidance process 400. The resulting innovation plaques formed from processing the Example 10 aerosol dispenser at the various different load-level percentages of ground innovation article show: L>82 at 50% load-level; $\Delta a^* < 1.5$ at 50% load-level; $\Delta b^* < 1.5$ at 50% load-level; and $\Delta$ haze (%)<10 at 50% load-level. The data indicates that Example 10 would be recognized as not adversely affecting the PET recycling stream.

Test Methods

Peak Molecular Weight (Mp) Measurement Method

The peak molecular weight is determined using a gel permeation chromatography (GPC) method. GPC is a well-known method wherein polymers are separated according to molecular size, the largest molecule eluting first. The peak molecular weights referred to herein can be determined with gel permeation chromatography (GPC) using polystyrene calibration standards, such as is done according to ASTM D5296. The molecular weight of any polymer or unknown polymer measured using GPC so calibrated is the styrene equivalent molecular weight, which herein is defined as the "peak molecular weight." Suitable solvents and temperatures are employed with GPC in order to achieve adequate molecular weight separation and resolution.

Enthalpy of Fusion Test Method

The Enthalpy of Fusion Parameter of a hot melt adhesive composition is determined using the Enthalpy of Fusion Test Method, which consists of performing ASTM D3418-15 with the following additional guidance. Specimen(s) are preferably extracted from molded or pelleted raw material adhesive composition. If raw material is not available, specimen(s) of adhesive are extracted from bonds of interest in an absorbent article using techniques known to those of skill in the art. Dry nitrogen is used as the purge gas in the differential scanning calorimeter (DSC). The rate of increase of temperature in the DSC is 10° C./min, and the rate of decrease of temperature in the DSC is 1° C./min. The mass-normalized enthalpy of fusion is calculated as specified in section 11.4 based on the curve corresponding to decreasing temperature (at 1° C./min) and is reported as the "Enthalpy of Fusion" in units of joules per gram (J/g) to the nearest 0.1 J/g.

Viscosity Test Method

The Viscosity Parameter of a hot melt adhesive composition is determined using the Viscosity Parameter Test Method, which consists of performing ASTM D3236-15 with the following additional guidance. A Brookfield RVT viscometer with spindle SC 4-27 (Brookfield Engineering, Middleboro, Mass., USA), or equivalent, is used. The sample temperature is maintained at 170.0±1.0° C., unless otherwise specified, throughout the measurement. The sample is preheated for 10 minutes and stirred with the measurement spindle for 30 min. The spindle is rotated at 20 rpm throughout the measurement. The resulting apparent viscosity, as described in section 10, is reported as the "viscosity" in units of millipascal-seconds to the nearest 100 mPa·s.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A polymeric aerosol dispenser for dispensing a product, the aerosol dispenser comprising:
    a container comprising a closed end bottom and a neck longitudinally opposed to the closed end bottom, wherein the neck defines an opening, wherein the container comprises at least 90% by weight polyethylene terephthalate;
    a valve assembly disposed in the container, wherein the valve assembly comprises:
        a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate;
        a valve stem extending through the inner passageway, wherein the valve stem comprises an outer stem surface and an inner stem surface opposite the outer stem surface, and wherein the valve stem is slidably engaged with a portion of the valve body;
        a valve seal separably joined to at least one of the valve body and the valve stem, wherein the valve seal has a valve seal density less than 1.0 g/cm$^3$, wherein the valve seal comprises a non-cross linked material, and wherein the valve seal is configured to operatively engage at least one of the valve body and the valve stem to form a seal therebetween; and
        a resilient member operatively engaged with the valve stem, wherein the resilient member is configured to control the movement of the valve stem, and wherein the resilient member has a resilient member density less than 1.0 g/cm$^3$; and
    a product delivery device disposed within the container.

2. The polymeric aerosol dispenser of claim 1, wherein the product delivery device is a dip tube, wherein the dip tube comprises a dip tube adaptor and a tube.

3. The polymeric aerosol dispenser of claim 2, wherein the dip tube adaptor comprises the polyethylene terephthalate and the tube comprises polyolefins.

4. The polymeric aerosol dispenser of claim 3, wherein the tube is separably joined to the dip tube adaptor.

5. The polymeric aerosol dispenser of claim 1, comprising a base cup separably joined to the bottom of the container.

6. The polymeric aerosol dispenser of claim 5, wherein the base cup is separably joined with an adhesive comprising a first propylene-ethylene copolymer having a peak molecular weight Mp (as described below) between about 4,000 g/mol and about 40,000 g/mol and a second propylene-ethylene copolymer having a peak molecular weight Mp above 40,000 g/mol.

7. The polymeric aerosol dispenser of claim 5, wherein the base cup is separably joined to with an adhesive, and wherein the adhesive is configured to remain attached to the base cup upon the base cup separating from the bottom of the container.

8. The polymeric aerosol dispenser of claim 5, wherein the base cup is separably joined to the bottom of the container with an adhesive, wherein the adhesive has a density less than 1.0 g/cm$^3$.

9. The polymeric aerosol dispenser of claim 1, comprising a base cup joined to the bottom of the container, wherein the base cup comprises polyethylene terephthalate.

10. The polymeric aerosol dispenser of claim 1, wherein the product delivery device is a bag.

11. The polymeric aerosol dispenser of claim 1, comprising an actuator separably joined to at least one of the container and the valve assembly, wherein the actuator has a density less than 1.0 g/cm$^3$.

12. The polymeric aerosol dispenser of claim 11, wherein the actuator comprises an orifice cup.

13. The polymeric aerosol dispenser of claim 1, comprising an actuator separably joined to at least one of the container and the valve assembly, wherein the actuator comprises polypropylene.

14. The polymeric aerosol dispenser of claim 13, wherein the actuator comprises an orifice cup.

15. The polymeric aerosol dispenser of claim 1, wherein the polyethylene terephthalate is recycled polyethylene terephthalate.

16. The polymeric aerosol dispenser of claim 1, wherein the valve seal is a polyolefin.

17. A polymeric aerosol dispenser for dispensing a product, the aerosol dispenser comprising:
    a container comprising a closed end bottom and a neck longitudinally opposed to the closed end bottom, wherein the neck defines an opening, wherein the container comprises at least 90% by weight polyethylene terephthalate;
    a valve assembly disposed in the container, wherein the valve assembly comprises:
        a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate;

a valve stem extending through the inner passageway, wherein the valve stem comprises an outer stem surface and an inner stem surface opposite the outer stem surface, and wherein the valve stem is slidably engaged with a portion of the valve body;

a valve seal joined to at least one of the valve body and the valve stem, wherein the valve seal comprises thermoplastic elastomers and wherein the thermoplastic elastomer is a non-cross-linked material; and a resilient member operatively engaged with the valve stem, wherein the resilient member is configured to control the movement of the valve stem, and wherein the resilient member has a resilient member density less than 1.0 g/cm$^3$;

a product delivery device disposed within the container.

18. The polymeric aerosol dispenser of claim 17, comprising an actuator operatively joined to the valve assembly, wherein the actuator comprises polypropylene.

19. The polymeric aerosol dispenser of claim 17, comprising a base cup joined to the container.

20. The polymeric aerosol dispenser of claim 19, wherein the base cup is joined with an adhesive comprising a first propylene-ethylene copolymer having a peak molecular weight Mp between about 4,000 g/mol and about 40,000 g/mol and a second propylene-ethylene copolymer having a peak molecular weight Mp above 40,000 g/mol.

21. The polymeric aerosol dispenser of claim 17, wherein the valve stem comprises polyethylene terephthalate or polypropylene.

22. A polymeric aerosol dispenser for dispensing a product, the aerosol dispenser comprising:

a container comprising a closed end bottom and a neck longitudinally opposed to the closed end bottom, wherein the neck defines an opening, wherein the container comprises at least 90% by weight polyethylene terephthalate;

a valve assembly disposed in the container, wherein the valve assembly comprises:

a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate;

a valve stem extending through the inner passageway, wherein the valve stem comprises an outer stem surface and an inner stem surface opposite the outer stem surface, wherein a portion of the valve seal operatively engages a portion of the outer stem surface, and wherein the valve stem is slidably engaged with a portion of the valve body; and a valve seal separably joined to at least one of the valve body and the valve stem, wherein the valve seal has a valve seal density less than 1.0 g/cm$^3$ and wherein the valve seal comprises a non-cross-linked material;

a resilient member operatively engaged with the valve stem, wherein the resilient member is configured to control the movement of the valve stem, and wherein the resilient member has a resilient member density less than 1.0 g/cm$^3$;

a product delivery device disposed within the container; and a base cup separably joined to the container, wherein the base cup has a base cup density less than 1.0 g/cm$^3$.

23. The polymeric aerosol container of claim 22, wherein the valve body is welded to the container.

24. The polymeric aerosol container of claim 22, wherein a portion of the product delivery device comprises polyethylene terephthalate, and where the portion of the product delivery device is fixedly joined to at least one of the valve body and the container.

25. The polymeric aerosol container of claim 22, wherein the product delivery device has a delivery device density less than 1.0 g/cm$^3$.

26. A polymeric aerosol dispenser for dispensing a product, the aerosol dispenser comprising:

a container comprising a closed end bottom and a neck longitudinally opposed to the closed end bottom, wherein the neck defines an opening, wherein the container comprises at least 90% by weight polyethylene terephthalate;

a valve assembly disposed in the container, wherein the valve assembly comprises:

a valve body fixedly joined to a portion of the container and extending about a longitudinal axis, wherein the valve body comprises an outer surface and an inner passageway extending about the longitudinal axis, wherein the inner passageway comprises a first passageway opening, a second passageway opening, and a passageway surface extending from the first passageway opening to the second passageway opening, and wherein the valve body comprises at least 90% polyethylene terephthalate;

a valve stem extending through the inner passageway, wherein the valve stem comprises an outer stem surface and an inner stem surface opposite the outer stem surface, wherein a portion of the valve seal operatively engages a portion of the outer stem surface, and wherein the valve stem is slidably engaged with a portion of the valve body;

a valve seal separably joined to at least one of the valve body and the valve stem, wherein the valve seal has a valve seal density less than 1.0 g/cm$^3$, and wherein the valve seal is not cross-linked; and a resilient member operatively engaged with the valve stem, wherein the resilient member is configured to control the movement of the valve stem, and wherein the resilient member has a resilient member density less than 1.0 g/cm$^3$;

a product delivery device disposed within the container, wherein at least a portion of the product delivery device comprises polyethylene terephthalate; and a base cup joined to the container, wherein the base cup comprises polyethylene terephthalate.

* * * * *